US008827852B2

(12) United States Patent
Ikegami

(10) Patent No.: US 8,827,852 B2
(45) Date of Patent: Sep. 9, 2014

(54) CONTROLLER FOR VEHICLE DRIVE UNIT

(75) Inventor: Takefumi Ikegami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 240 days.

(21) Appl. No.: 13/383,728

(22) PCT Filed: Jul. 13, 2010

(86) PCT No.: PCT/JP2010/061854
§ 371 (c)(1),
(2), (4) Date: Jan. 12, 2012

(87) PCT Pub. No.: WO2011/007786
PCT Pub. Date: Jan. 20, 2011

(65) Prior Publication Data
US 2012/0115674 A1 May 10, 2012

(30) Foreign Application Priority Data

Jul. 14, 2009 (JP) .................................. 2009-165784

(51) Int. Cl.
*F16H 3/72* (2006.01)
*B60W 10/11* (2012.01)
*B60K 6/48* (2007.10)
*B60W 30/19* (2012.01)
*B60K 6/36* (2007.10)
*B60W 10/113* (2012.01)
*B60K 6/547* (2007.10)
*F16H 3/00* (2006.01)
*B60W 20/00* (2006.01)
*F16H 61/688* (2006.01)

(52) U.S. Cl.
CPC ............. *B60K 6/48* (2013.01); *B60L 2240/421* (2013.01); *F16H 3/006* (2013.01); *B60W 20/00* (2013.01); *Y02T 10/6221* (2013.01); *B60W 10/11* (2013.01); *Y02T 10/642* (2013.01); *B60W 2710/081* (2013.01); *B60W 30/19* (2013.01); *B60K 6/36* (2013.01); *B60W 10/113* (2013.01); *F16H 61/688* (2013.01); *B60K 6/547* (2013.01)
USPC ............................................................ 475/5

(58) Field of Classification Search
None
See application file for complete search history.

(56) References Cited

U.S. PATENT DOCUMENTS 7,462,121 B2 * 12/2008 Janson et al. ...................... 475/5

FOREIGN PATENT DOCUMENTS

| CN | 1781789 A | 6/2006 |
|---|---|---|
| CN | 101108586 A | 1/2008 |
| JP | 2002-204504 A | 7/2002 |
| JP | 2005-147312 A | 6/2005 |
| JP | 2006-118590 A | 5/2006 |
| JP | 2009-073390 A | 4/2009 |

OTHER PUBLICATIONS

International Search Report of PCT/JP2010/061854, mailing date of Aug. 10, 2010.
Chinese Office Action dated Feb. 28, 2014, issued in corresponding Chinese Patent Applidation No. 201080031306.3 (5 pages).

* cited by examiner

*Primary Examiner* — Erin D Bishop
(74) *Attorney, Agent, or Firm* — Westerman, Hattori, Daniels & Adrian, LLP

(57) ABSTRACT

While driving is performed by transmitting the power of an engine 6 through a gear of a second gear group, pre-shifting is performed to a gear of a first gear group, the gear being on a higher speed side than the gear of the second gear group, so that the rotation speed of a motor 7 does not exceed a predetermined rotation speed.

9 Claims, 28 Drawing Sheets

< 4th Post3 MODE ASSISTANCE >

< 4th MODE (BOTH CLUTCHES ARE ENGAGED) ASSISTANCE >

< 4th Pre5 MODE ASSISTANCE >

< 5th MODE ASSISTANCE >

⟨5th EV MODE⟩

FIG. 24

FORWARD

| VEHICLE STATE | | CLUTCH | | SYNCHROMESH, SHIFTER | | | | MOTOR | | | ENGINE |
|---|---|---|---|---|---|---|---|---|---|---|---|
| FUNCTION | STATE | ODD STAGE | EVEN STAGE | 1 SYN | 3-5 | 2-4 | Rvs Park | ROTATION DIRECTION | TORQUE APPLICATION DIRECTION | STATE | |
| ENGINE START DURING STOPPAGE | ENGINE START | ● | | − | − | − | − | FORWARD | FORWARD | DRIVE | START |
| ORDINARY TRAVELING | 1st | ● | | 1 | − | − | − | FORWARD | FORWARD | DRIVE | ○ |
| | | ● | | 1 | − | − | − | FORWARD | REVERSE | CHARGING | ○ |
| | 1st Pre2 | ● | | 1 | − | 2 | − | FORWARD | FORWARD | DRIVE | ○ |
| | | ● | | 1 | − | 2 | − | FORWARD | REVERSE | CHARGING | ○ |
| | 2nd Post1 | | ● | 1 | − | 2 | − | FORWARD | FORWARD | DRIVE | ○ |
| | | | ● | 1 | − | 2 | − | FORWARD | REVERSE | CHARGING | ○ |
| | 2nd | ● | ● | − | − | 2 | − | FORWARD | FORWARD | DRIVE | ○ |
| | | ● | ● | − | − | 2 | − | FORWARD | REVERSE | CHARGING | ○ |
| | | | ● | − | − | 2 | − | | | DISENGAGE | ○ |
| | 2nd Pre3 | | ● | − | 3 | 2 | − | FORWARD | FORWARD | DRIVE | ○ |
| | | | ● | − | 3 | 2 | − | FORWARD | REVERSE | CHARGING | ○ |
| | 3rd Post2 | ● | | − | 3 | 2 | − | FORWARD | FORWARD | DRIVE | ○ |
| | | ● | | − | 3 | 2 | − | FORWARD | REVERSE | CHARGING | ○ |
| | 3rd | ● | | − | 3 | − | − | FORWARD | FORWARD | DRIVE | ○ |
| | | ● | | − | 3 | − | − | FORWARD | REVERSE | CHARGING | ○ |
| | 3rd Pre4 | ● | | − | 3 | 4 | − | FORWARD | FORWARD | DRIVE | ○ |
| | | ● | | − | 3 | 4 | − | FORWARD | REVERSE | CHARGING | ○ |
| | 4th Post3 | | ● | − | 3 | 4 | − | FORWARD | FORWARD | DRIVE | ○ |
| | | | ● | − | 3 | 4 | − | FORWARD | REVERSE | CHARGING | ○ |
| | 4th | ● | ● | − | − | 4 | − | FORWARD | FORWARD | DRIVE | ○ |
| | | ● | ● | − | − | 4 | − | FORWARD | REVERSE | CHARGING | ○ |
| | | | ● | − | − | 4 | − | | | DISENGAGE | ○ |
| | 4th Pre5 | | ● | − | 5 | 4 | − | FORWARD | FORWARD | DRIVE | ○ |
| | | | ● | − | 5 | 4 | − | FORWARD | REVERSE | CHARGING | ○ |
| | 5th Post4 | ● | | − | 5 | 4 | − | FORWARD | FORWARD | DRIVE | ○ |
| | | ● | | − | 5 | 4 | − | FORWARD | REVERSE | CHARGING | ○ |
| | 5th | ● | | − | 5 | − | − | FORWARD | FORWARD | DRIVE | ○ |
| | | ● | | − | 5 | − | − | FORWARD | REVERSE | CHARGING | ○ |
| | RVS | | ● | 1 | − | − | Rvs | REVERSE | REVERSE | DRIVE | ○ |
| | | | ● | 1 | − | − | Rvs | REVERSE | FORWARD | CHARGING | ○ |
| MOTOR TRAVELING | 1st | | | 1 | − | − | − | FORWARD | FORWARD | DRIVE | − |
| | | | | 1 | − | − | − | FORWARD | REVERSE | REGENERATION | − |
| | 3rd | | | − | 3 | − | − | FORWARD | FORWARD | DRIVE | − |
| | | | | − | 3 | − | − | FORWARD | REVERSE | REGENERATION | − |
| | 5th | | | − | 5 | − | − | FORWARD | FORWARD | DRIVE | − |
| | | | | − | 5 | − | − | FORWARD | REVERSE | REGENERATION | − |
| | RVS | | | 1 | − | − | − | REVERSE | REVERSE | DRIVE | − |
| | | | | 1 | − | − | − | REVERSE | FORWARD | REGENERATION | − |
| | | | | − | 3 | − | − | REVERSE | REVERSE | DRIVE | − |
| | | | | − | 3 | − | − | REVERSE | FORWARD | REGENERATION | − |
| | | | | − | 5 | − | − | REVERSE | REVERSE | DRIVE | − |
| | | | | − | 5 | − | − | REVERSE | FORWARD | REGENERATION | − |
| ENGINE START DURING MOTOR TRAVELING | (1st) | ● | | 1 | − | − | − | FORWARD | FORWARD | DRIVE | START |
| | | | ● | 1 | − | 2 | − | FORWARD | FORWARD | DRIVE | START |
| | | | ● | 1 | − | 4 | − | FORWARD | FORWARD | DRIVE | START |
| | (3rd) | ● | | − | 3 | − | − | FORWARD | FORWARD | DRIVE | START |
| | | | ● | − | 3 | 2 | − | FORWARD | FORWARD | DRIVE | START |
| | | | ● | − | 3 | 4 | − | FORWARD | FORWARD | DRIVE | START |
| | (5th) | ● | | − | 5 | − | − | FORWARD | FORWARD | DRIVE | START |
| | | | ● | − | 5 | 2 | − | FORWARD | FORWARD | DRIVE | START |
| | | | ● | − | 5 | 4 | − | FORWARD | FORWARD | DRIVE | START |
| Parking | Parking | | | − | − | − | − | FORWARD | REVERSE | CHARGING | − |

CONTROLLER FOR VEHICLE DRIVE UNIT

TECHNICAL FIELD

The present invention relates to a controller for a hybrid vehicle drive unit.

BACKGROUND ART

On the basis of an automated transmission (hereafter referred to as AMT) in which the transmission operation of a manual transmission having high transmission efficiency is automated and for the purpose of preventing shocks due to torque interruption during transmission shifting, a hybrid vehicle drive unit (AMT-HEV) equipped with a twin-clutch type transmission, the two input shafts of which have gear groups and can be connected to an engine via clutches respectively and one input shaft of which can be driven by a motor generator, has been proposed conventionally (refer to Patent document 1).

In the vehicle drive unit 100 described in Patent document 1, as shown in FIG. 28, two input shafts 101 and 102 are connected to an engine Eng through clutches C1 and C2 respectively, and a motor generator MG is connected to the input shaft 102. Furthermore, when the input shaft 102 is connected to a counter shaft 107 through a low-speed gear train 106 by engaging a dog clutch 105, and the input shaft 101 is connected to the counter shaft 107 through a high-speed gear train 109 by engaging a dog clutch 108.

In addition, it is disclosed that when shift-up is performed depending on vehicle speed during low-speed traveling after the dog clutch 105 is engaged and the clutch C2 is engaged, the engagement of the dog clutch 108 is started, the clutch C2 is released, and the clutch C1 is engaged. Hence, shift-up from the low-speed side to the high-speed side is performed.

RELATED ART DOCUMENT

Patent Document

Patent document 1: Japanese Patent Application Laid-Open Publication No. 2005-147312

SUMMARY OF THE INVENTION

Problem to be Solved by the Invention

However, since the dog clutch 105 remains engaged after the shift-up in the vehicle drive unit 100, the power of the counter shaft 107 rotates the motor generator MG therewith through the low-speed gear train 106. At this time, since the rotation speed of the input shaft 102 on the low-speed side is higher than the rotation speed of the input shaft 101 on the high-speed side, the motor generator MG is rotated at high speed; hence, the load on the motor generator MG is large and a failure may be caused.

In consideration of the above-mentioned circumstances, an object of the present invention is to provide a controller for a vehicle drive unit capable of preventing over speed rotation of a motor due to shift change and reducing the load on the motor.

Means for Solving the Problem

In order to accomplish the above-mentioned object, an inventive aspect according to claim 1 provides: a controller for a vehicle drive unit (for example, vehicle drive units 1, 1A and 1B according to the embodiment described later), equipped with an internal combustion engine (for example, an engine 6 according to the embodiment described later); an electric motor (for example, a motor 7 according to the embodiment described later); a first gear group having a plurality of gears (for example, a third-speed drive gear 23a, a fifth-speed drive gear 25a and a seventh-speed drive gear 97a according to the embodiment described later) connected to the internal combustion engine through a first engaging/disengaging device (for example, a first clutch 41 according to the embodiment described later) and selectable using a first synchronizing device (for example, a first transmission shifter 51 according to the embodiment described later); and a second gear group having a plurality of gears (for example, a second-speed drive gear 22a, a fourth-speed drive gear 24a and a sixth-speed drive gear 96a according to the embodiment described later) connected to the internal combustion engine through a second engaging/disengaging device (for example, a second clutch 42 according to the embodiment described later) and selectable using a second synchronizing device (for example, a second transmission shifter 52 according to the embodiment described later), the power of at least one of the internal combustion engine and the electric motor being input to the first gear group, the power of the internal combustion engine being input to the second gear group, after the engagement of the first engaging/disengaging device and during driving through a gear of the first gear group selected by the first synchronizing device, driving being able to be performed using a gear of the second gear group selected by the second synchronizing device by changing the engagement states of the first engaging/disengaging device and the second engaging/disengaging device, and the electric motor rotating through the gear group, wherein while driving is performed by transmitting the power of the internal combustion engine through the gear of the second gear group, pre-shifting is performed to a gear of the first gear group, the gear being on a higher speed side than the gear of the second gear group, so that the rotation speed of the electric motor does not exceed a predetermined rotation speed.

In order to accomplish the above-mentioned object, an inventive aspect according to claim 2 provides:

a controller for a vehicle drive unit (for example, vehicle drive units 1, 1A and 1B according to the embodiment described later), equipped with an internal combustion engine (for example, an engine 6 according to the embodiment described later); an electric motor (for example, a motor 7 according to the embodiment described later); a differential reduction gear (for example, a differential reduction gear and a planetary gear mechanism 31 according to the embodiment described later) configured so as to be capable of differentially rotating first to third rotational elements (for example, a sun gear 32, a ring gear 35 and a carrier 36 according to the embodiment described later) with one another; a first input/output shaft (for example, a first main shaft 11 according to the embodiment described later) connected to the first rotational element of the differential reduction gear and selectively connected to the internal combustion engine through a first engaging/disengaging device (for example, a first clutch 41 according to the embodiment described later); a second input/output shaft (for example, a second intermediate shaft 16 according to the embodiment described later) selectively connected to the internal combustion engine through a second engaging/disengaging device (for example, a second clutch 42 according to the embodiment described later); an output/input shaft (for example, a counter shaft 14 according to the embodiment described later) disposed so that power can be transmitted to the first input/output shaft and the second input/output shaft, the electric motor being connected to the first rotational element or the third rotational element, a first gear group having a plurality of gears (for example, a third-speed drive gear 23*a*, a fifth-speed drive gear 25*a* and a seventh-speed drive gear 97*a* according to the embodiment described later) selectable using a first synchronizing device (for example, a first transmission shifter 51 according to the embodiment described later) being provided on the first input/output shaft, a second gear group having a plurality of gears (for example, a second-speed drive gear 22*a*, a fourth-speed drive gear 24*a* and a sixth-speed drive gear 96*a* according to the embodiment described later) selectable using a second synchronizing device (for example, a second transmission shifter 52 according to the embodiment described later) being provided on the second input/output shaft, and after the engagement of the first engaging/disengaging device and during driving through a gear of the first gear group selected by the first synchronizing device, driving being able to be performed using a gear of the second gear group selected by the second synchronizing device by changing the engagement states of the first engaging/disengaging device and the second engaging/disengaging device, wherein while driving is performed by transmitting the power of the internal combustion engine to the input/output shaft through the gear of the second gear group, pre-shifting is performed to a gear of the first gear group, the gear being on a higher speed side than the gear of the second gear group, so that the rotation speed of the electric motor does not exceed a predetermined rotation speed.

An inventive aspect according to claim 3 provides the controller for the vehicle drive unit, wherein, in addition to the configuration of the inventive aspect according to in claim 2, the vehicle drive unit is characterized in that the electric motor is connected to the first rotational element and that a lock mechanism (for example, a synchromesh mechanism 61 according to the embodiment described later) is provided on the third rotational element.

An inventive aspect according to claim 4 provides the controller for the vehicle drive unit, wherein in addition to the configuration of the inventive aspect according to in claim 2, the vehicle drive unit is characterized in that the electric motor is connected to the third rotational element and that the combined power of the internal combustion engine and the electric motor is output to the second rotational element.

An inventive aspect according to claim 5 provides the controller for the vehicle drive unit, wherein in addition to the configuration of the inventive aspect according to any one of claims 2 to 4, a third gear group having a plurality of gears (for example, a first common driven gear 23*b*, a second common driven gear 24*b* and a third common driven gear 96*b* according to the embodiment described later) commonly engaged with the gears of the first gear group and the gears of the second gear group is provided on the output/input shaft.

An inventive aspect according to claim 6 provides the controller for the vehicle drive unit, in addition to the configuration of the inventive aspect according to any one of claims 1 to 5, further comprising:

a vehicle speed detecting device (for example, a vehicle speed detecting device 58 according to the embodiment described later) for detecting vehicle speed, and a synchronous position detecting device (for example, a synchronous position detecting device 57 according to the embodiment described later) for detecting the connection position of the first synchronizing device, wherein the first synchronizing device is controlled so that the electric motor rotates in a predetermined vehicle speed range depending on the connection position of the first synchronizing device.

An inventive aspect according to claim 7 provides the controller for the vehicle drive unit, in addition to the configuration of the inventive aspect according to any one of claims 2 to 5, further comprising:

a detecting device (for example, a shaft rotation speed detecting device 59 according to the embodiment described later) for detecting the rotation speed of the first input/output shaft, wherein the first synchronizing device is controlled so that the first synchronizing device is rotated in a predetermined rotation speed range.

An inventive aspect according to claim 8 provides the controller for the vehicle drive unit, in addition to the configuration of the inventive aspect according to any one of claims 2 to 5, further comprising:

a detecting device (for example, a shaft rotation speed detecting device 59 according to the embodiment described later) for detecting the rotation speed of the output/input shaft, and a synchronous position detecting device (for example, the synchronous position detecting device 57 according to the embodiment described later) for detecting the connection position of the first synchronizing device, wherein the first synchronizing device is controlled so that the electric motor rotates in a predetermined rotation speed range of the output/input shaft depending on the connection position of the first synchronizing device.

An inventive aspect according to claim 9 provides the controller for the vehicle drive unit, in addition to the configuration of the inventive aspect according to any one of claims 1 to 5, further comprising:

a detecting device (for example, a motor rotation speed detecting device 8 according to the embodiment described later) for detecting the rotation speed of the electric motor, wherein the first synchronizing device is controlled so that the electric motor rotates in the predetermined rotation speed range.

An inventive aspect according to claim 10 provides the controller for the vehicle drive unit, in addition to the configuration of the inventive aspect according to any one of claims 1 to 9, further comprising:

an electric motor temperature detecting device (for example, a motor temperature detecting device 9 according to the embodiment described later) for detecting the temperature of the electric motor or detecting the value of its current and estimating the temperature of the electric motor from the value of the current, wherein the timing of pre-shifting is corrected depending on the temperature of the electric motor.

An inventive aspect according to claim 11 provides the controller for the vehicle drive unit, in addition to the configuration of the inventive aspect according to any one of claims 1 to 10, wherein the first synchronizing device is set to its neutral state in the case that the rotation speed of the electric motor exceeds the predetermined rotation speed or the temperature of the electric motor exceeds the predetermined temperature while driving is performed using the power of the internal combustion engine through a gear of the second gear group although the first synchronizing device has selected the maximum speed gear of the first gear group.

Advantage of the Invention

With the controller for the vehicle drive unit according to claim 1, while driving is performed by transmitting the power of the internal combustion engine through the gear of the second gear group, pre-shifting is performed to a gear of the first gear group, the gear being on a higher speed side than the gear of the second gear group, so that the rotation speed of the electric motor does not exceed the predetermined rotation speed; hence, the electric motor rotating through the first transmission section can be prevented from rotating at an excessively high rotation speed at the time of shift change, whereby an excessive load can be suppressed from being applied to the electric motor.

With the controller for the vehicle drive unit according to claim 2, while driving is performed by transmitting the power of the internal combustion engine to the output/input shaft through the gear of the second gear group, pre-shifting is performed to a gear of the first gear group, the gear being on a higher speed side than the gear of the second gear group, so that the rotation speed of the electric motor does not exceed the predetermined rotation speed; hence, the electric motor rotating can be prevented from rotating at an excessively high rotation speed at the time of shift change, whereby an excessive load can be suppressed from being applied to the electric motor.

With the controller for the vehicle drive unit according to claims 3 and 4, the electric motor is connected to the first rotational element or the third rotational element of the differential reduction gear, whereby the total power of the power of the internal combustion engine and the power of the electric motor can be used for the traveling of a vehicle With the controller for the vehicle drive unit according to claim 5, the third gear group having the plurality of gears commonly engaged with the gears of the first gear group and the gears of the second gear group is provided on the output/input shaft, whereby the number of the gears can be halved in comparison with a case in which gears engaged with the respective gears of the first gear group and the second gear group are provided, and the drive unit can be made compact.

With the controller for the vehicle drive unit according to claim 6, the first synchronizing device is controlled so that the electric motor rotates in the predetermined vehicle speed range depending on the connection position of the first synchronizing device, whereby over speed rotation of the electric motor can be prevented.

With the controller for the vehicle drive unit according to claim 7, the first synchronizing device is controlled so that the first input/output shaft rotates in the predetermined rotation speed range, whereby over speed rotation of the electric motor can be prevented.

With the controller for the vehicle drive unit according to claim 8, the first synchronizing device is controlled so that the electric motor rotates in the predetermined rotation speed range of the output/input shaft depending on the connection position of the first synchronizing device, whereby over speed rotation of the electric motor can be prevented.

With the controller for the vehicle drive unit according to claim 9, the first synchronizing device is controlled so that the electric motor rotates in the predetermined rotation speed range, whereby over speed rotation of the electric motor can be prevented.

BRIEF DESCRIPTION OF THE DRAWINGS

FIG. 3(a) is a velocity diagram, and FIG. 3(b) is a view showing the state of torque transmission in the vehicle drive unit;

FIG. 4(a) is a velocity diagram, and FIG. 4(b) is a view showing the state of torque transmission in a power output apparatus;

FIG. 5(a) is a velocity diagram, and FIG. 5(b) is a view showing the state of torque transmission in the vehicle drive unit;

FIG. 7(a) is a velocity diagram, and FIG. 7(b) is a view showing the state of torque transmission in the vehicle drive unit;

FIG. 8(a) is a velocity diagram, and FIG. 8(b) is a view showing the state of torque transmission in the vehicle drive unit;

FIG. 9(a) is a velocity diagram, and FIG. 9(b) is a view showing the state of torque transmission in the vehicle drive unit;

FIG. 11(a) is a velocity diagram, and FIG. 11(b) is a view showing the state of torque transmission in the vehicle drive unit;

FIG. 13(a) is a velocity diagram, and FIG. 13(b) is a view showing the state of torque transmission in the vehicle drive unit;

FIG. 14(a) is a velocity diagram, and FIG. 14(b) is a view showing the state of torque transmission in the vehicle drive unit;

FIG. 15(a) is a velocity diagram, and FIG. 15(b) is a view showing the state of torque transmission in the vehicle drive unit;

FIG. 17(a) is a velocity diagram, and FIG. 17(b) is a view showing the state of torque transmission in the vehicle drive unit;

FIG. 18(a) is a velocity diagram, and FIG. 18(b) is a view showing the state of torque transmission in the vehicle drive unit;

FIG. 19(a) is a velocity diagram, and FIG. 19(b) is a view showing the state of torque transmission in the vehicle drive unit;

FIG. 20(a) is a velocity diagram, and FIG. 20(b) is a view showing the state of torque transmission in the vehicle drive unit;

FIG. 22(a) is a velocity diagram, and FIG. 22(b) is a view showing the state of torque transmission in the vehicle drive unit;

FIG. 24 is a view summarizing the vehicle state and the states of the clutch, transmission shifter, brake, motor and engine of the vehicle drive unit shown in FIG. 1;

MODE FOR CARRYING OUT THE INVENTION

Figure 1:
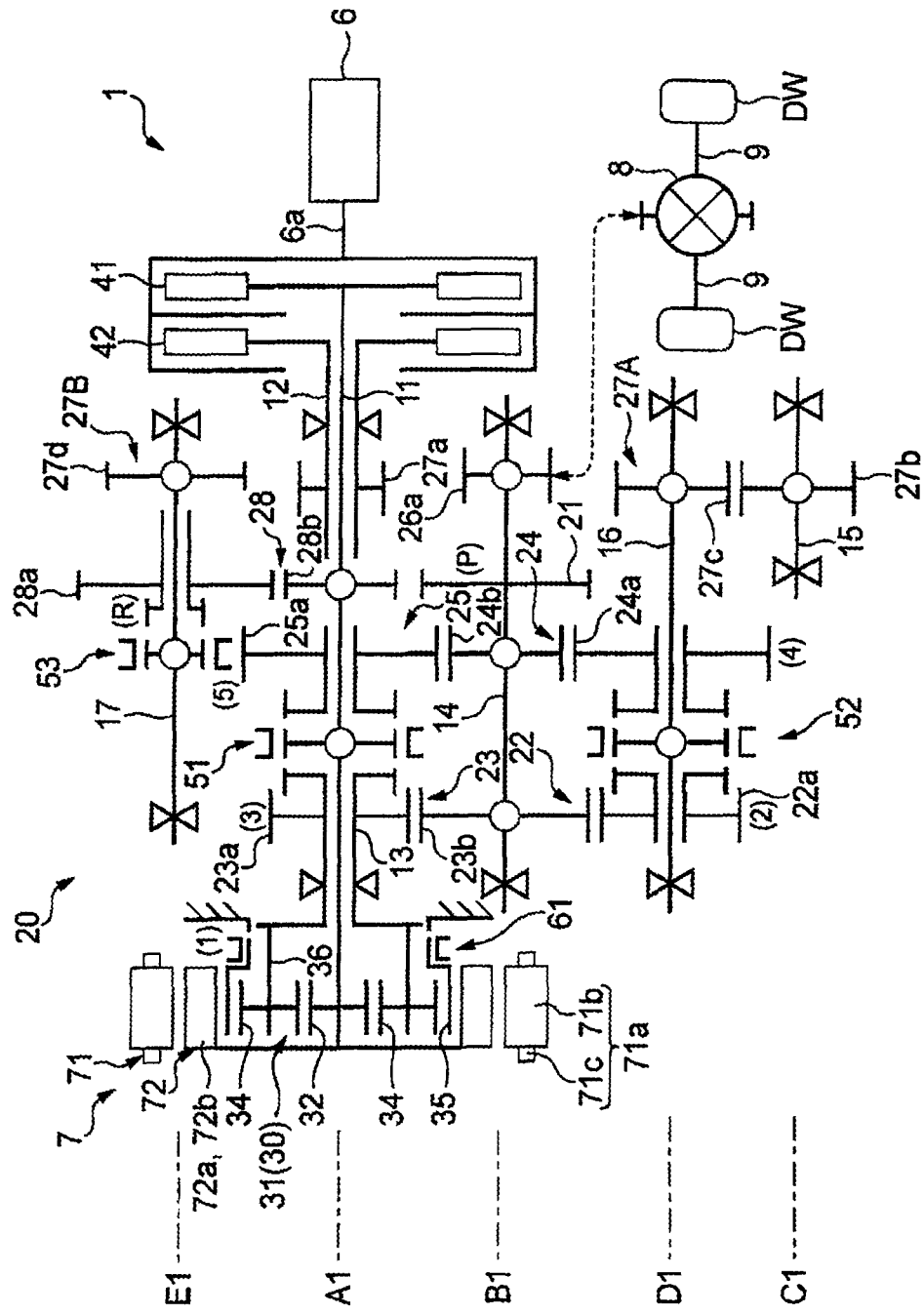
FIG. 1 is a schematic view showing an example of a vehicle drive unit to which a controller according to the present invention is applicable.

An embodiment of a controller for a vehicle drive unit according to the present invention will be described below referring to the drawings. FIG. 1 is a view showing a schematic configuration of the drive system of a hybrid vehicle.

As shown in FIG. 1, a vehicle drive unit 1 drives drive wheels DW and DW (driven sections) through the drive shafts 9 and 9 of a vehicle (not shown) and is equipped with an internal combustion engine (hereafter referred to as "engine") 6 serving as a drive source, an electric motor (hereafter referred to as "motor") 7, a transmission 20 for transmitting power to the drive wheels DW and DW, and a differential reduction gear 30 constituting part of the transmission 20.

The engine 6 is, for example, a gasoline engine, and the first clutch 41 (a first engaging/disengaging device) and the second clutch (a second engaging/disengaging device) of the transmission 20 are connected to the crankshaft 6a of the engine 6.

The motor 7 is a three-phase brushless DC motor and has a stator 71 containing 3n armatures 71a and a rotor 72 disposed so as to be opposed to this stator 71. The armatures 71a, each containing an iron core 71b and a coil 71c wound around this iron core 71b, are secured to a casing (not shown) and arranged at almost equal intervals in the circumferential direction around a rotation shaft. The 3n coils 71c constitute n sets of three-phase coils of U, V and W phases.

The rotor 72 has n permanent magnets 72a arranged at almost equal intervals around the rotation shaft, and the polarities of two adjacent permanent magnets 72a are different from each other. A securing section 72b for securing the respective permanent magnets 72a has a hollow cylindrical shape made of a soft magnetic material (for example, iron), disposed on the outer circumferential side of the ring gear 35 of a planetary gear mechanism 31 constituting the differential reduction gear 30 described later, and connected to the sun gear 32 of the planetary gear mechanism 31. Hence, the rotor 72 is configured so as to integrally rotate with the sun gear 32 of the planetary gear mechanism 31 constituting the differential reduction gear 30.

The differential reduction gear 30 is formed of the single-pinion type planetary gear mechanism 31 and has the sun gear 32; the ring gear 35 disposed coaxial with the sun gear 32 so as to surround the circumference of the sun gear 32; planetary gears 34 engaged with the sun gear 32 and the ring gear 35; and a carrier 36 for supporting the planetary gears 34 so that the planetary gears 34 can rotate on their axes and revolve around the sun gear. Hence, the sun gear 32, the ring gear 35 and the carrier 36 are configured so as to be rotatable differentially from one another.

A synchromesh mechanism 61 (locking mechanism) configured so as to be able to stop (lock) the rotation of the ring gear 35 is connected to the ring gear 35.

The transmission 20 is the so-called twin-clutch type transmission equipped with the above-mentioned first clutch and second clutch 42, the planetary gear mechanism 31 constituting the differential reduction gear 30 and a plurality of speed change gear groups described later.

More specifically, the transmission 20 is equipped with a first main shaft 11 (first input/output shaft) disposed coaxial with the crankshaft 6a of the engine 6 (coaxial with a rotation axis line A1); a second main shaft 12; a connecting shaft 13; a counter shaft 14 (output/input shaft) being rotatable around a rotation axis line B1 disposed in parallel with the rotation axis line A1; a first intermediate shaft 15 being rotatable around a rotation axis line C1 disposed in parallel with the rotation axis line A1; a second intermediate shaft 16 (second input/output shaft) being rotatable around a rotation axis line D1 disposed in parallel with the rotation axis line A1; and a reverse shaft 17 being rotatable around a rotation axis line E1 disposed in parallel with the rotation axis line A1.

The first clutch 41 is connected to the first main shaft 11 on the side of the engine 6, and the sun gear 32 of the planetary gear mechanism 31 and the rotor 72 of the motor 7 are mounted on the first main shaft 11 on the opposite side of the engine 6. Hence, the first main shaft 11 is configured so as to be selectively connected to the crankshaft 6a of the engine 6 through the first clutch 41 and directly connected to the motor 7, whereby the power of the engine 6 and/or the motor 7 is transmitted to the sun gear 32.

The second main shaft 12 is configured so as to be shorter than the first main shaft 11 and hollow and is disposed so as to enclose the circumference of the first main shaft 11 on the side of the engine 6 and so as to be rotatable relatively therewith. Furthermore, the second clutch 42 is connected to the second main shaft 12 on the side of the engine 6, and an idle drive gear 27a is integrally mounted on the second main shaft 12 on the opposite side of the engine 6. Hence, the second main shaft 12 is configured so as to be selectively connected to the crankshaft 6a of the engine 6 through the second clutch 42, whereby the power of the engine 6 is transmitted to the idle drive gear 27a.

The connecting shaft 13 is configured so as to be shorter than the first main shaft 11 and hollow and is disposed so as to enclose the circumference of the first main shaft 11 on the opposite side of the engine 6 and so as to be rotatable relatively therewith. Furthermore, s third-speed drive gear 23a is integrally mounted on the connecting shaft 13 on the side of the engine 6, and the carrier 36 of the planetary gear mechanism 31 is integrally mounted on the connecting shaft 13 on the opposite side of the engine 6. With this configuration, the carrier 36 and the third-speed drive gear 23a mounted on the connecting shaft 13 are integrally rotated by the revolution of the planetary gears 34 around the sun gear.

Moreover, a fifth-speed drive gear 25a is provided on the first main shaft 11 between the third-speed drive gear 23a mounted on the connecting shaft 13 and the idle drive gear 27a mounted on the second main shaft 12 so as to be rotatable relatively with the first main shaft 11, and a reverse driven gear 28b integrally rotating with the first main shaft 11 are mounted on the first main shaft 11. Besides, a first transmission shifter 51 is provided to connect or release the first main shaft 11 to or from the third-speed drive gear 23a or the fifth-speed drive gear 25a between the third-speed drive gear 23a and the fifth-speed drive gear 25a. In addition, when the first transmission shifter 51 is in-gear engaged at its third-speed connection position, the first main shaft 11 is connected to the third-speed drive gear 23a so that they rotate integrally; when the first transmission shifter 51 is in-gear engaged at its fifth-speed connection position, the first main shaft 11 and the fifth-speed drive gear 25a rotate integrally; when the first transmission shifter 51 is at its neutral position, the first main shaft 11 rotates relatively with the third-speed drive gear 23a and the fifth-speed drive gear 25a. When the first main shaft 11 and the third-speed drive gear 23a rotate integrally, the sun gear 32 mounted on the first main shaft 11 and the carrier 36 connected to the third-speed drive gear 23a through the connecting shaft 13 rotate integrally, and the ring gear 35 also rotates integrally, whereby the components of the planetary gear mechanism 31 are integrated.

A first idle driven gear 27b engaged with the idle drive gear 27a mounted on the second main shaft 12 is integrally mounted on the first intermediate shaft 15.

A second idle driven gear 27c engaged with the first idle driven gear 27b mounted on the first intermediate shaft 15 is integrally mounted on the second intermediate shaft 16. The second idle driven gear 27c and the above-mentioned idle drive gear 27a and first idle driven gear 27b constitute a first idle gear train 27A. Furthermore, a second-speed drive gear 22a and a fourth-speed drive gear 24a relatively rotatable with the second intermediate shaft 16 are provided on the second intermediate shaft 16 at positions respectively corresponding to the third-speed drive gear 23a and the fifth-speed drive gear 25a provided around the first main shaft 11. Moreover, on the second intermediate shaft 16, a second transmission shifter 52 is provided to connect or release the second intermediate shaft 16 to or from the second-speed drive gear 22a or the fourth-speed drive gear 24a between the second-speed drive gear 22a and the fourth-speed drive gear 24a. In addition, when the second transmission shifter 52 is in-gear engaged at its second-speed connection position, the second intermediate shaft 16 and the second-speed drive gear 22a rotate integrally; when the second transmission shifter 52 is in-gear engaged at its fourth-speed connection position, the second intermediate shaft 16 and the fourth-speed drive gear 24a rotate integrally; when the second transmission shifter 52 is at its neutral position, the second intermediate shaft 16 rotates relatively with the second-speed drive gear 22a and the fourth-speed drive gear 24a.

A first common driven gear 23b, a second common driven gear 24b, a parking gear 21 and a final gear 26a are mounted on the counter shaft 14 in this order from the opposite side of the engine 6 so as to be rotatable integrally.

The first common driven gear 23b is engaged with the third-speed drive gear 23a mounted on the connecting shaft 13, and the gear 23b and the third-speed drive gear 23a constitute a third-speed gear pair 23; and the gear 23b is engaged with the second-speed drive gear 22a provided on the second intermediate shaft 16, and the gear 23b and the second-speed drive gear 22a constitute a second-speed gear pair 22.

The second common driven gear 24b is engaged with the fifth-speed drive gear 25a mounted on the first main shaft 11, and the gear 24b and the fifth-speed drive gear 25a constitute a fifth-speed gear pair 25; and the gear 24b is engaged with the fourth-speed drive gear 24a provided on the second intermediate shaft 16, and the gear 24b and the fourth-speed drive gear 24a constitute a fourth-speed gear pair 24.

The final gear 26a is engaged with a differential gear mechanism 8, and the differential gear mechanism 8 is connected to the drive wheels DW and DW through the drive shafts 9 and 9. Hence, the power transmitted to the counter shaft 14 is output from the final gear 26a to the drive wheels DW and DW through the differential gear mechanism 8 and the drive shafts 9 and 9.

A third idle driven gear 27d engaged with the first idle driven gear 27b mounted on the first intermediate shaft 15 is integrally mounted on the reverse shaft 17. The third idle driven gear 27d and the above-mentioned idle drive gear 27a and first idle driven gear 27b constitute a second idle gear train 27B. Furthermore, a reverse drive gear 28a engaged with the reverse driven gear 28b mounted on the first main shaft 11 is provided on the reverse shaft 17 so as to be rotatable relatively with the reverse shaft 17. The reverse drive gear 28a and the reverse driven gear 28b constitute a reverse gear train 28. Moreover, a reverse shifter 53 is provided to connect or release the reverse shaft 17 to or from the reverse drive gear 28a on the side of the reverse drive gear 28a on the opposite side of the engine 6. In addition, when the reverse shifter 53 is in-gear engaged at its reverse connection position, the reverse shaft 17 and the reverse drive gear 28a rotate integrally; when reverse shifter 53 is at its neutral position, the reverse shaft 17 rotates relatively with the reverse drive gear 28a.

With the above-mentioned configuration, the vehicle drive unit 1 according to the embodiment has first to fifth transmission paths described below.

(1) A first transmission path is a transmission path in which the crankshaft 6a of the engine 6 is connected to the drive wheels DW and DW through the first main shaft 11, the planetary gear mechanism 31, the connecting shaft 13, the third-speed gear pair 23 (the third-speed drive gear 23a and the first common driven gear 23b), the counter shaft 14, the final gear 26a, the differential gear mechanism 8 and the drive shafts 9 and 9. The reduction ratio of the planetary gear mechanism 31 serving as a differential reduction gear is set so that the engine torque to be transmitted through the first transmission path is equivalent to that for first-speed traveling. In other words, the reduction ratio obtained by multiplying the reduction ratio of the planetary gear mechanism 31 by the reduction ratio of the third-speed gear pair 23 is equivalent to that for first-speed traveling.

(2) A second transmission path is a transmission path in which the crankshaft 6a of the engine 6 is connected to the drive wheels DW and DW through the second main shaft 12, the first idle gear train 27A (the idle drive gear 27a, the first idle driven gear 27b and the second idle driven gear 27c), the second intermediate shaft 16, the second-speed gear pair 22 (the second-speed drive gear 22a and the first common driven gear 23b) or the fourth-speed gear pair 24 (the fourth-speed drive gear 24a and the second common driven gear 24b), the counter shaft 14, the final gear 26a, the differential gear mechanism 8 and the drive shafts 9 and 9.

(3) A third transmission path is a transmission path in which the crankshaft 6a of the engine 6 is connected to the drive wheels DW and DW through the first main shaft 11, the third-speed gear pair 23 (the third-speed drive gear 23a and the first common driven gear 23b) or the fifth-speed gear pair 25 (the fifth-speed drive gear 25a and the second common driven gear 24b), the counter shaft 14, the final gear 26a, the differential gear mechanism 8 and the drive shafts 9 and 9. (4) A fourth transmission path is a transmission path in which the motor 7 is connected to the drive wheels DW and DW through the planetary gear mechanism or the third-speed gear pair 23 (the third-speed drive gear 23*a* and the first common driven gear 23*b*) or the fifth-speed gear pair 25 (the fifth-speed drive gear 25*a* and the second common driven gear 24*b*), the counter shaft 14, the final gear 26*a*, the differential gear mechanism 8 and the drive shafts 9 and 9.

(5) A fifth transmission path is a transmission path in which the crankshaft 6*a* of the engine 6 is connected to the drive wheels DW and DW through the second main shaft 12, the second idle gear train 27B (the idle drive gear 27*a*, the first idle driven gear 27*b* and the third idle driven gear 27*d*), the reverse shaft 17, the reverse gear train 28 (the reverse drive gear 28*a* and the reverse driven gear 28*b*), the planetary gear mechanism 31, the connecting shaft 13, the third-speed gear pair 23 (the third-speed drive gear 23*a* and the first common driven gear 23*b*), the counter shaft 14, the final gear 26*a*, the differential gear mechanism 8 and the drive shafts 9 and 9.

Figure 2:
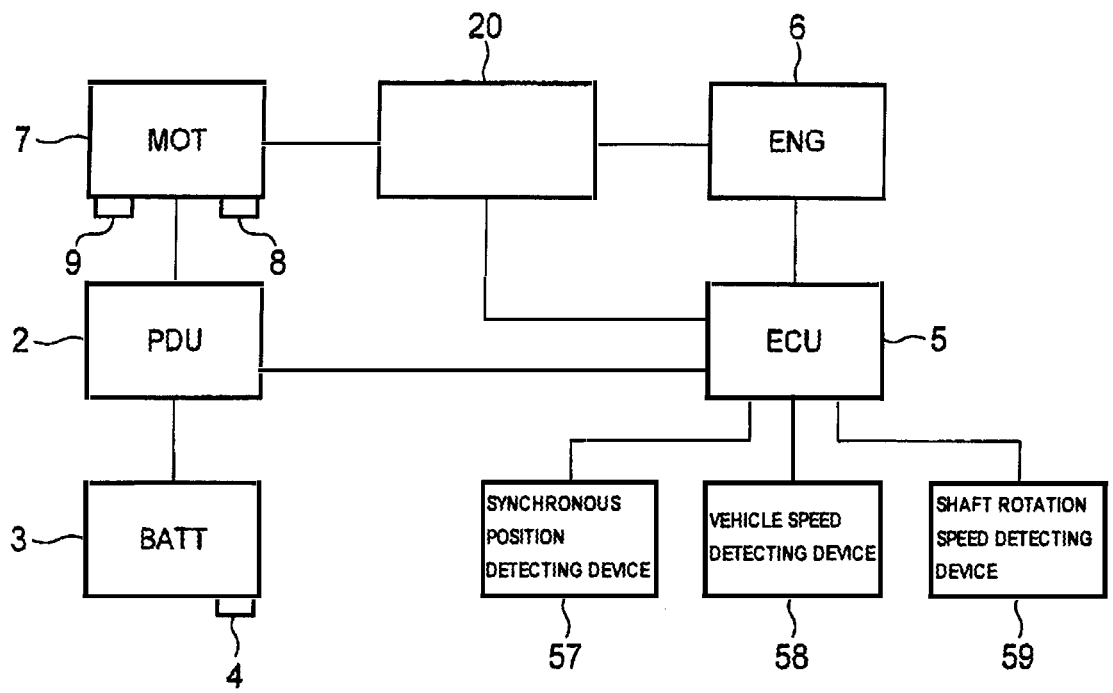
FIG. 2 is a view showing a schematic configuration of the control system of the vehicle drive unit shown in FIG. 1.

Furthermore, in the vehicle drive unit 1 according to the embodiment, as shown in FIG. 2, the motor 7 is connected to a power control unit (hereafter referred to as PDU) 2 for controlling its operation, a motor rotation speed detecting device 8 for detecting the rotation speed of the motor 7, and a motor temperature detecting device 9 for detecting the temperature of the motor 7. The PDU 2 is connected to a battery 3 that supplies electric power to the motor 7 or is charged by electric power from the motor 7. To the battery 3, a SOC detecting device 4 for detecting the remaining capacity (hereafter referred to as state of charge or SOC) of the battery is connected. The motor 7 is driven by the electric power supplied from the battery 3 through the PDU 2. In addition, the motor 7 can charge the battery 3 (energy recovery) by performing regenerative power generation by the rotation of the drive wheels DW and DW during deceleration traveling or the power of the engine 6. Moreover, the PDU 2 is connected to an electric control unit (hereafter referred to as ECU) 5. The ECU 5 is a controller for controlling the entire vehicle in various ways and is connected to a synchronous position detecting device 57 for detecting the connection position of the first transmission shifter 51, a vehicle speed detecting device 58 for detecting the vehicle speed and a shaft rotation speed detecting device 59 for detecting the rotation speed of the first main shaft 11 and/or the counter shaft 14. All the motor rotation speed detecting device 8, the vehicle speed detecting device 58 and the shaft rotation speed detecting device 59 are not necessarily required to be provided, but at least one of them should only be provided.

An acceleration request, a braking request, the rotation speed of the engine, the rotation speed of the motor, the temperature of the motor, the rotation speeds of the first and second main shafts 11 and 12, the rotation speeds of the counter shaft 14, etc., vehicle speed, shift positions, SOC, etc. are input to the ECU 5; on the other hand, signals for controlling the engine 6, signals for controlling the motor 7, signals indicating the power generation state, charge state, discharge state, etc. of the battery 3, signals for controlling the first and second transmission shifter 51 and 52 and the reverse shifter 53, signals for controlling the locking of the synchromesh mechanism 61, etc. are output from the ECU 5.

In the vehicle drive unit 1 configured as described above, the third-speed drive gear 23*a* and the fifth-speed drive gear 25*a* constitute an odd-number stage gear group (first gear group); the second-speed drive gear 22*a* and the fourth-speed drive gear 24*a* constitute an even-number stage gear group (second gear group); and the first common driven gear 23*b* and the second common driven gear 24*b* constitute an output gear group (third gear group).

Next, the operation control of the vehicle drive unit 1 will be described. In the following descriptions, it is assumed that the first and second clutches 41 and 42 are disengaged, that the first, second and reverse shifters 51 to 53 are at their neutral positions, and that the synchromesh mechanism 61 is in its lock-off state (SYN lock OFF) in which the ring gear 35 is allowed to rotate, unless otherwise specified in the following description. This state is hereafter referred to as initial state.

First, the stop state of the vehicle in the vehicle drive unit 1, that is, the OFF (IG_OFF) state of the ignition, will be described.

Figure 3:
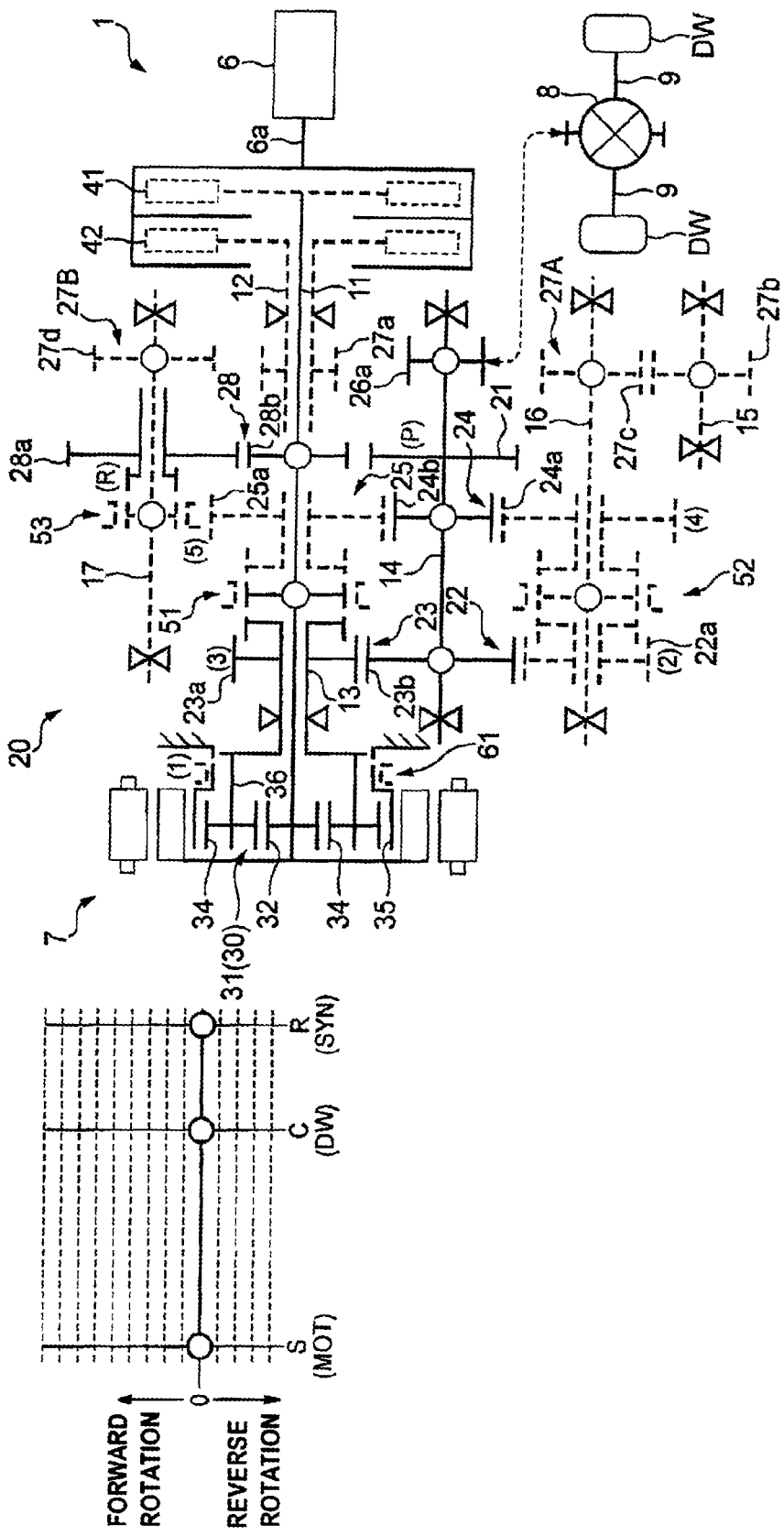
FIG. 3 is a view showing a state when a vehicle is stopped.

In the OFF state of the ignition, as shown in FIG. 3, since the engine 6 and the motor 7 are stopped, no torque is generated. At this time, the vehicle drive unit 1 is in the initial state.

Figure 4:
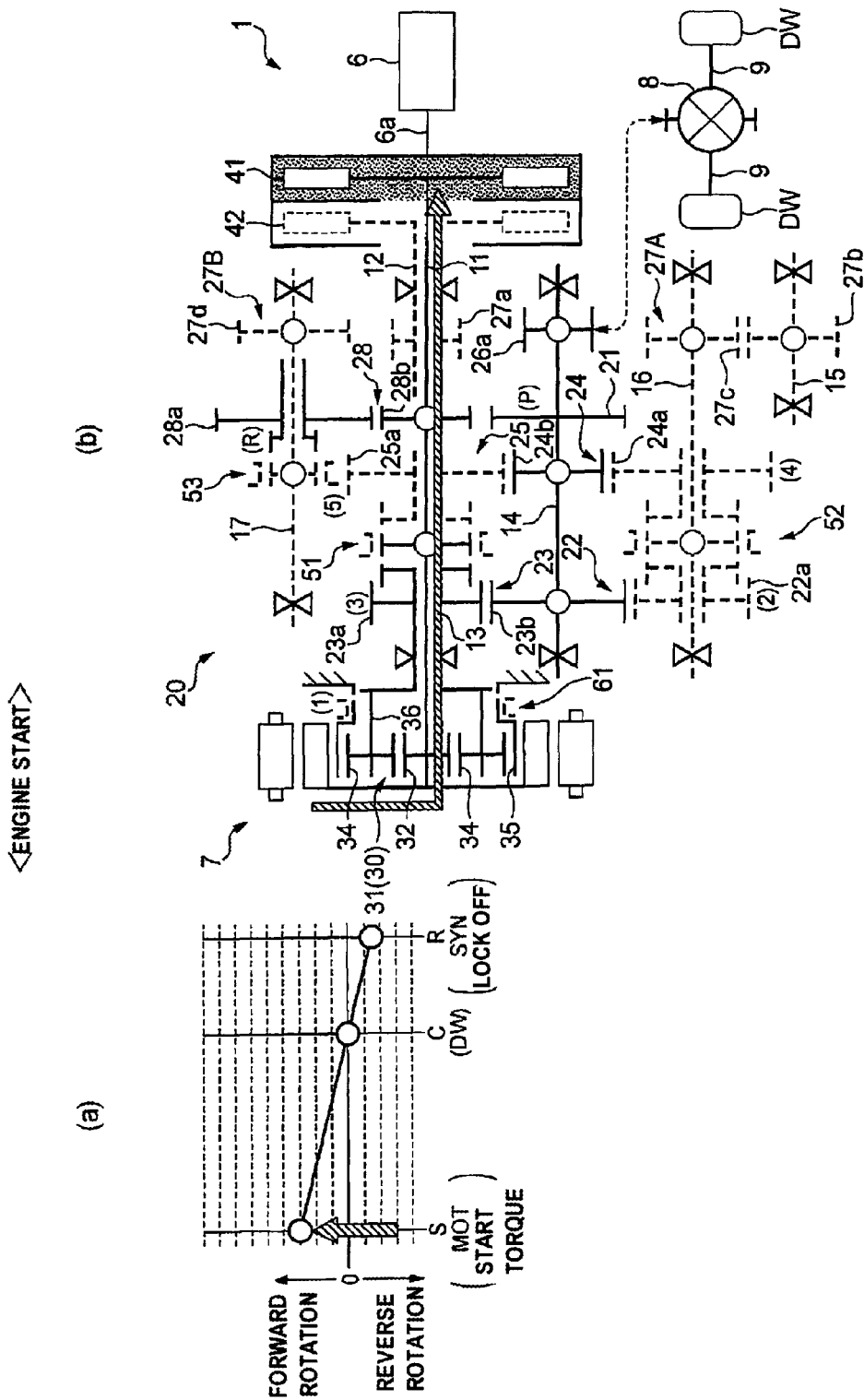
FIG. 4 is a view showing a state when an engine is started.

From this state, when the ignition is turned ON (IG_ON), when the motor 7 is driven (a torque is applied in the forward rotation direction) and when the first clutch 41 is engaged, the sun gear 32 of the planetary gear mechanism 31 connected to the rotor 72 rotates in the forward rotation direction as shown in FIG. 4. Since the synchromesh mechanism 61 is not locked at this time, the ring gear 35 rotates in the reverse rotation direction. Hence, the motor torque is not transmitted to the carrier 36, and the vehicle is at a stop. Then, the motor torque is transmitted from the first main shaft 11 integrally rotating with the sun gear 32 to the crankshaft 6*a* of the engine 6, whereby the crankshaft 6*a* is cranked and the engine 6 is started (ENG start during stoppage).

Figure 6:
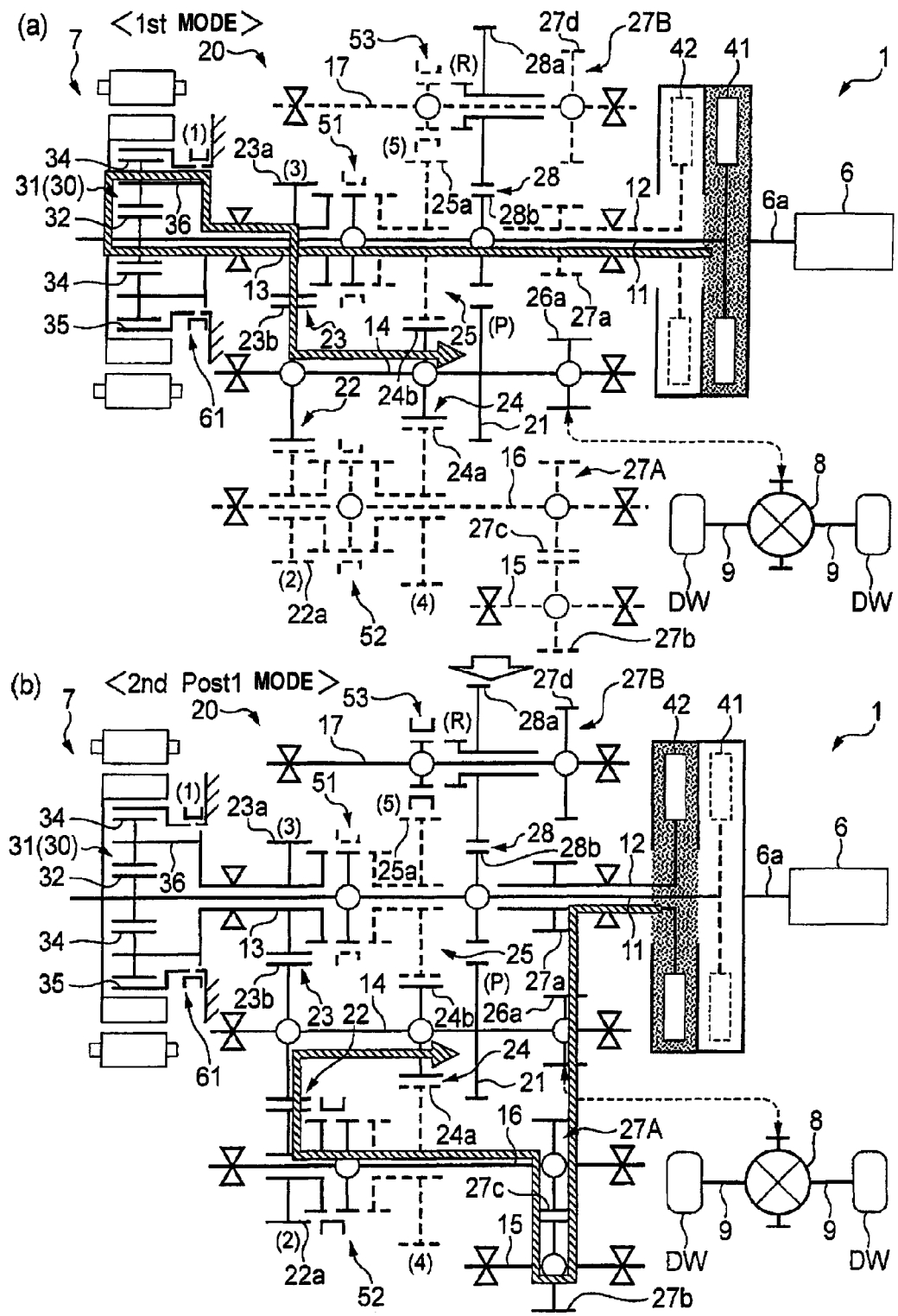
FIG. 6(a) is a view showing the state of torque transmission in the vehicle drive unit in the 1st mode.
FIG. 6(b) is a view showing the state of torque transmission in the vehicle drive unit in a 2nd Post 1 mode.

Then, after the engine is started, when the first clutch 41 is engaged and the engine torque is raised while the synchromesh mechanism 61 is locked, the engine torque transmitted to the sun gear 32 is transmitted to the carrier while being subjected to speed reduction, and then further transmitted to the drive wheels DW and DW through the first transmission path passing through the above-mentioned third-speed gear pair 23 to perform first-speed traveling as shown in FIG. 6(*a*). This state shown in FIG. 6(*a*) is referred to as 1st mode.

Figure 5:
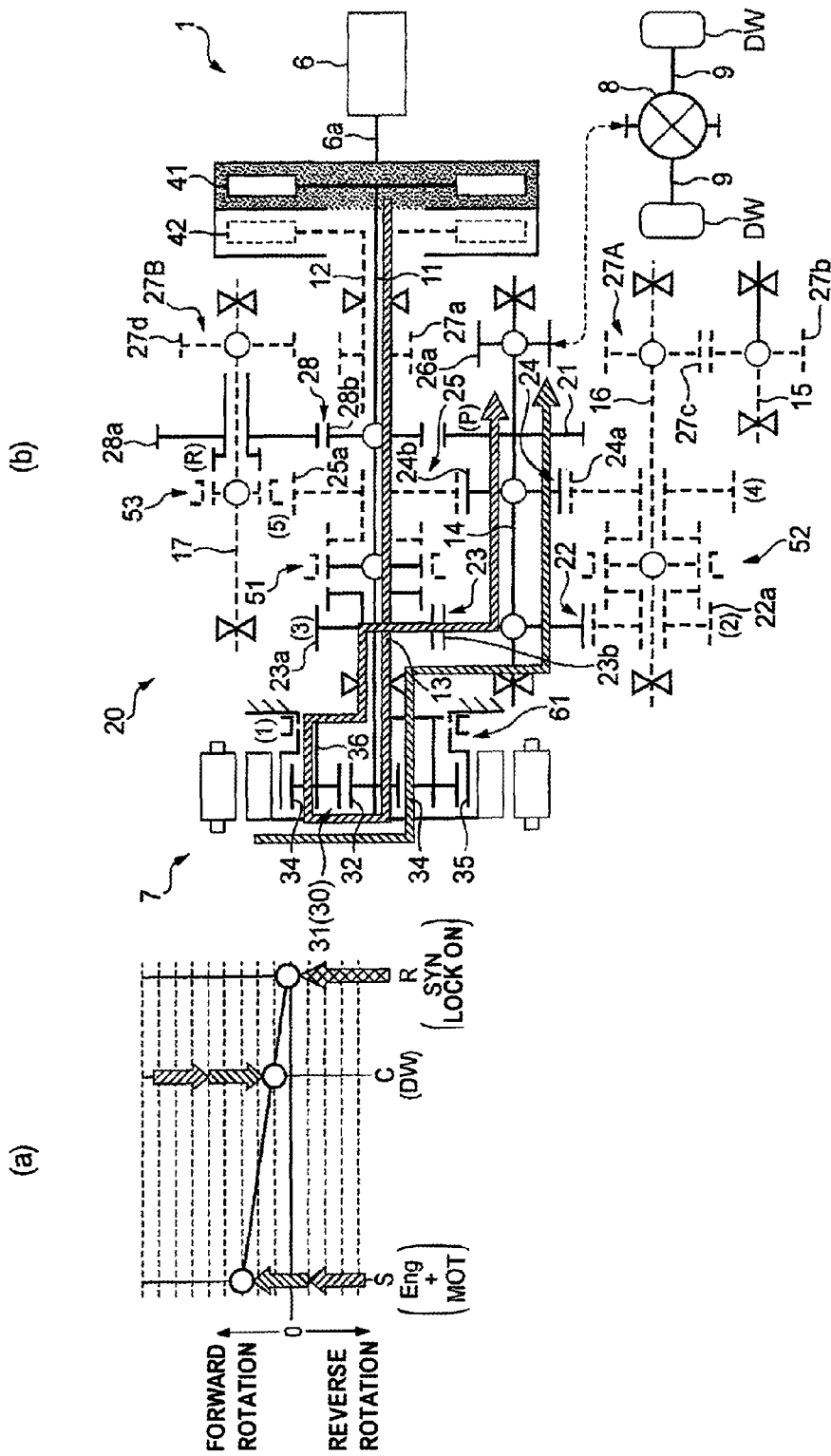
FIG. 5 is a view showing a state when assistance is provided in a 1st mode.

FIG. 5 shows a case in which the motor 7 provides assistance during traveling in the 1st mode. In the velocity diagram shown in FIG. 5(*a*), the stop position of the motor 7 is represented by 0, the upward direction is represented as the forward rotation direction, the downward direction is represented as the reverse rotation direction, the sun gear 32 is represented by "S", the carrier 36 is represented by "C", the ring gear 35 is represented by "R". These are similarly applicable to the velocity diagrams in FIGS. 3 and 4 and velocity diagrams described later. In addition, FIG. 5(*b*) is a view showing the state of torque transmission, and each thick hatched arrow indicates the flow of a torque, and the hatching in the arrow corresponds to the hatching of each arrow indicating a torque in the velocity diagram. Furthermore, the forward rotation direction of the motor 7 is defined as the direction along which a forward torque is transmitted to the drive wheels DW and DW through the drive shafts 9 and 9, and the reverse rotation direction thereof is defined as the direction along which a reverse torque is transmitted to the drive wheels DW and DW through the drive shafts 9 and 9.

When the motor 7 is driven to apply the motor torque in the forward rotation direction during traveling in the 1st mode, the motor torque is transmitted from the sun gear to the carrier 36 while being subjected to speed reduction and then further transmitted to the drive wheels DW and DW through the fourth transmission path passing through the above-mentioned third-speed gear pair 23. In other words, the engine torque and the motor torque are transmitted to the sun gear 32, and the combined torque is transmitted to the drive wheels DW and DW. On the other hand, when the motor 7 is not driven and a regenerative torque in the reverse rotation direction is applied to the motor 7, charging can be performed by the motor 7.

Next, shift-up control from the first-speed traveling to second-speed traveling will be described. First, from the state of the 1st mode shown in FIG. 6(a), the second transmission shifter 52 is in-gear engaged from its neutral position to its second-speed connection position. The state in which the second transmission shifter 52 is pre-shifted to the second-speed connection position during the first-speed traveling is hereafter referred to as 1st Pre 2 mode. Even in this state, assistance or charging can be performed using the motor 7 by driving the motor 7 and by applying the motor torque in the forward rotation direction or by applying the regenerative torque in the reverse rotation direction. Furthermore, when the engagement states of the first and second clutches 41 and 42 are changed, that is, when the first clutch 41 is disengaged and the second clutch 42 is engaged, the engine torque is transmitted to the drive wheels DW and DW through the second transmission path passing through the second-speed gear pair 22 as shown in FIG. 6(b), whereby the second-speed traveling is performed. The state shown in FIG. 6(b) in which the synchromesh mechanism 61 remains locked during the second-speed traveling is hereafter referred to as 2nd Post 1 mode. At this time, by the engagement between the third-speed drive gear 23a and the first common driven gear 23b, the rotation speed of the motor 7 is increased through the third-speed gear pair 23 and the planetary gear mechanism 31 as viewed from the counter shaft 14, and the motor 7 is rotated together at a rotation speed higher than the rotation speed of the counter shaft 14.

Figure 7:
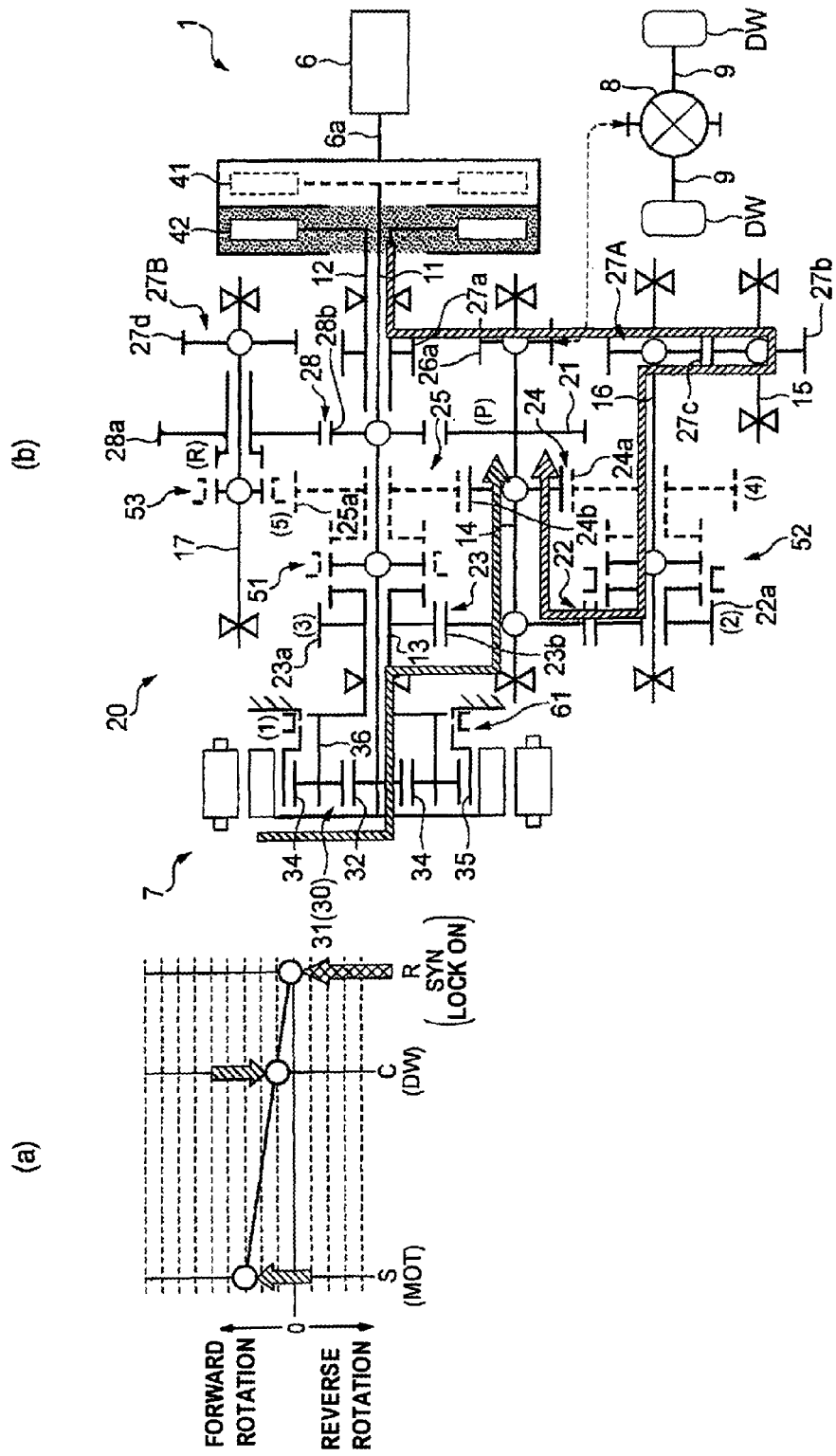
FIG. 7 is a view showing a state when assistance is provided in the 2nd Post 1 mode.

FIG. 7 is a view showing a case in which the motor 7 provides assistance during traveling in the 2nd Post 1 mode. From this state, when the motor 7 is driven to apply the motor torque in the forward rotation direction, the motor torque is input to the sun gear 32, the motor torque is transmitted from the sun gear 32 to the carrier 36 while being subjected to speed reduction and then further transmitted to the drive wheels DW and DW through the fourth transmission path passing through the above-mentioned third-speed gear pair 23. On the other hand, when the motor 7 is not driven and the regenerative torque in the reverse rotation direction is applied to the motor 7, charging can be performed by the motor 7.

Figure 10:
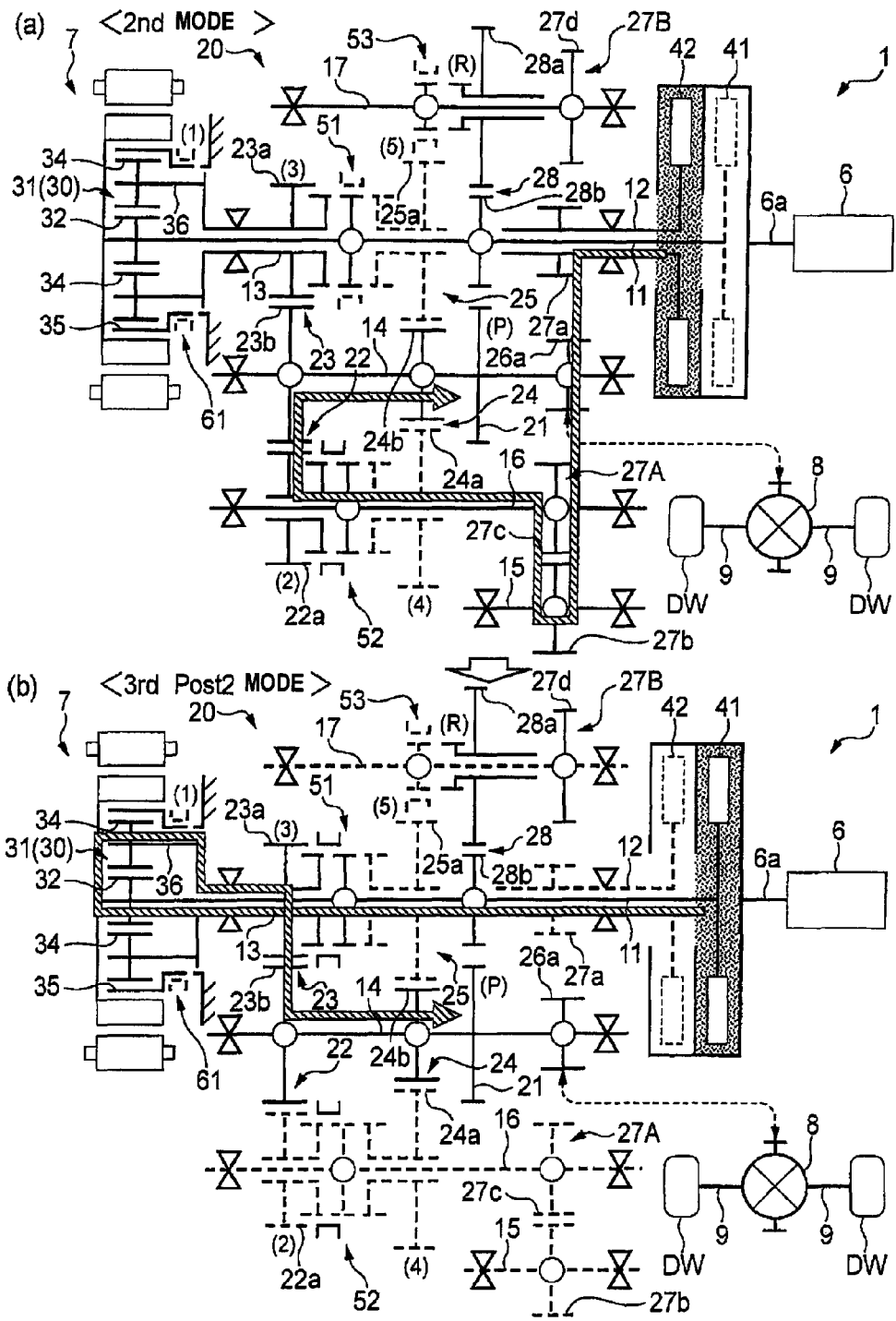
FIG. 10(a) is a view showing the state of torque transmission in the vehicle drive unit in the 2nd mode.
FIG. 10(b) is a view showing the state of torque transmission in the vehicle drive unit in a 3rd Post 2 mode.

Then, when the locking of the synchromesh mechanism 61 is released as shown in FIG. 10(a) from the 2nd Post 1 mode, a 2nd mode is obtained. In this 2nd mode, since the first clutch 41 is disengaged and the locking of the synchromesh mechanism 61 is released, the sun gear 32 and the ring gear 35 rotate idly, and the motor 7 is disengaged.

Furthermore, in addition to the configuration shown in FIG. 10(a), the 2nd mode has a configuration in which the locking of the synchromesh mechanism 61 is released and the first clutch 41 remains engaged and the second clutch 42 is engaged, instead of changing the engagement states of the first and second clutches 41 and 42 from the 1st Pre 2 mode.

Figure 8:
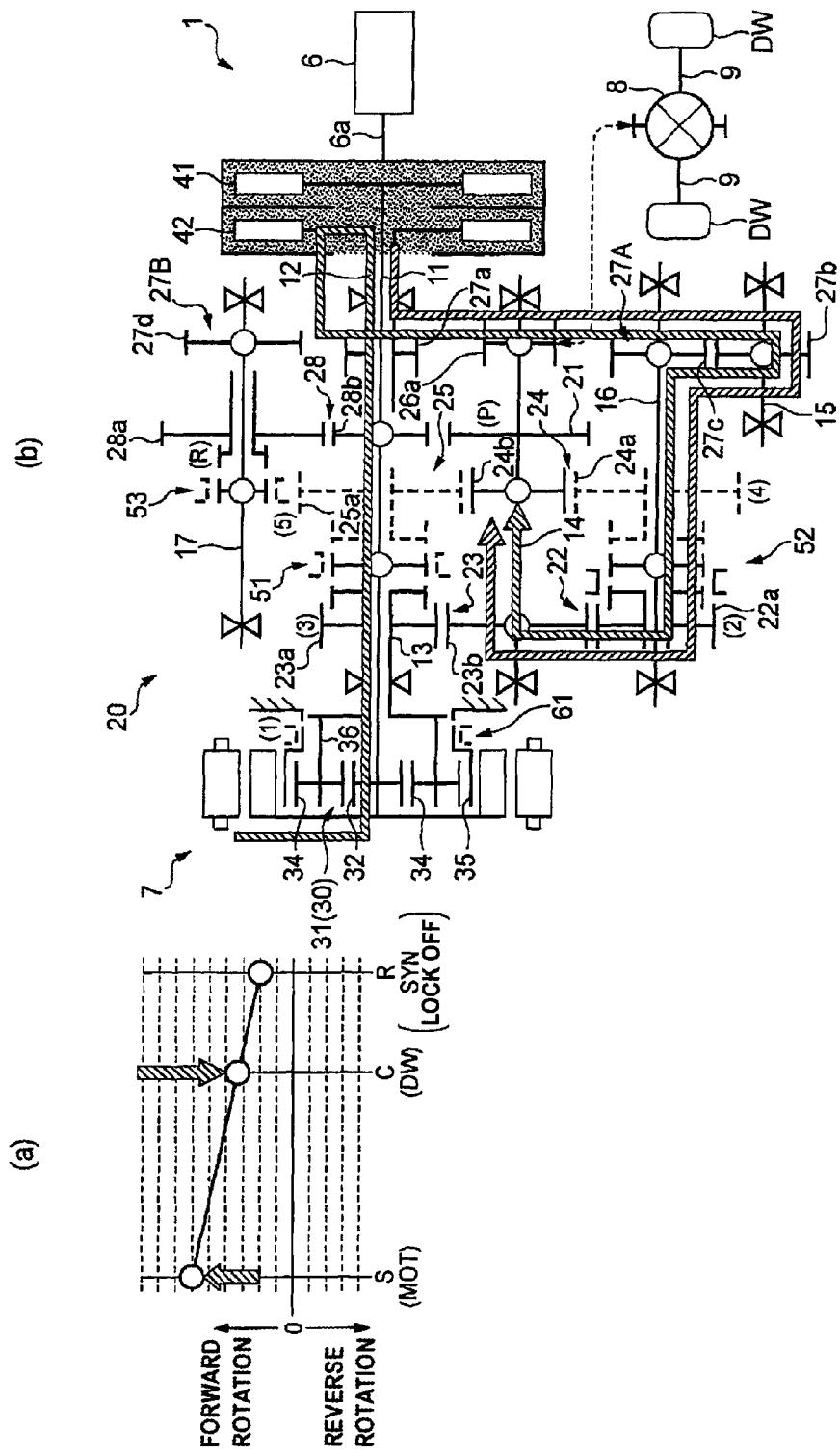
FIG. 8 is a view showing a state when assistance is provided in a 2nd mode (both clutches are engaged)

FIG. 8 shows a case in which the motor 7 provides assistance during traveling in the 2nd mode in which both the first and second clutches 41 and 42 are engaged (both the clutches are engaged). From this state, when the motor is driven to apply the motor torque in the forward rotation direction, the combined torque of the motor torque and the engine torque is transmitted to the drive wheels DW and DW through the second transmission path passing through the second-speed gear pair 22. On the other hand, when the motor 7 is not driven and the regenerative torque in the reverse rotation direction is applied to the motor 7, charging can be performed by the motor 7. In the case that both the first and second clutches 41 and 42 are engaged, the sun gear 32 is rotated at the reduction ratio of the second speed and the carrier 36 is rotated at the reduction ratio of the third speed, whereby a constant differential rotation occurs in the planetary gear mechanism 31 as shown in FIG. 8(a).

Next, shift-up control from the second-speed traveling to third-speed traveling will be described. First, from the 2nd mode shown in FIG. 10(a), the first transmission shifter 51 is in-gear engaged from the neutral position to its third-speed connection position. The state in which the first transmission shifter 51 is pre-shifted to the third-speed connection position during the second-speed traveling is hereafter referred to as 2nd Pre 3 mode.

Figure 9:
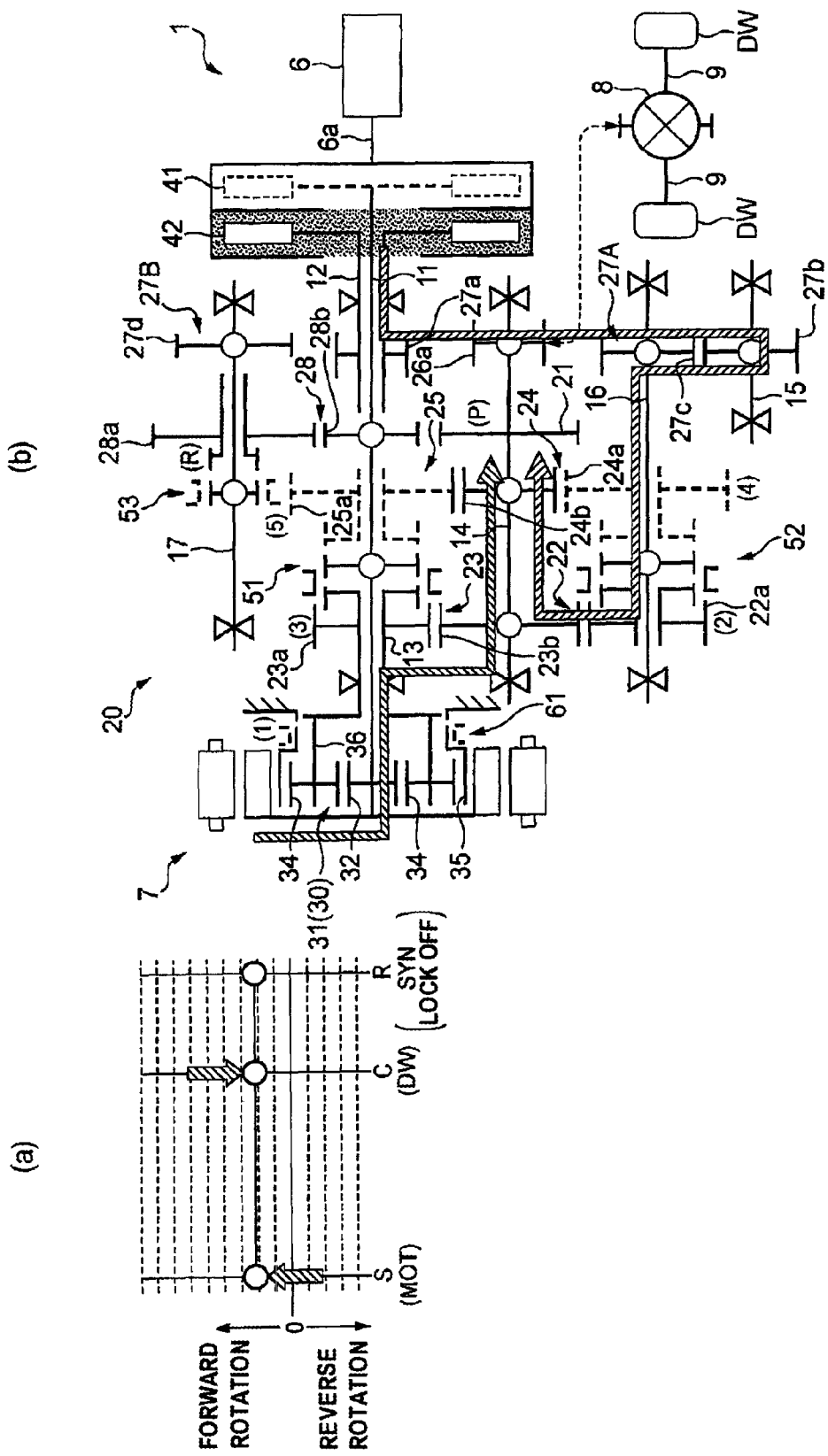
FIG. 9 is a view showing a state when assistance is provided in a 2nd Pre 3.

FIG. 9 is a view showing a case in which the motor 7 provides assistance during traveling in the 2nd Pre 3 mode. As described above, when the first transmission shifter 51 is in-gear engaged at the third-speed connection position, the components of the planetary gear mechanism 31 are rotated integrally. Hence, when the motor 7 is driven to apply the motor torque in the forward rotation direction, the motor torque is transmitted to the drive wheels DW and DW through the fourth transmission path passing through the third-speed gear pair 23 directly without being subjected to speed reduction. On the other hand, when the motor 7 is not driven and the regenerative torque in the reverse rotation direction is applied to the motor 7, charging can be performed by the motor 7.

Then, when the engagement states of the first and second clutches 41 and 42 are changed, that is, when the second clutch 42 is disengaged and the first clutch 41 is engaged, the engine torque is transmitted to the drive wheels DW and DW through the third transmission path passing through the third-speed gear pair 23, whereby the third-speed traveling is performed as shown in FIG. 10(b). The state shown in FIG. 10(b) in which the second transmission shifter 52 remains in-gear engaged at the second connection position during the third-speed traveling is hereafter referred to as 3rd Post 2 mode. Even in this state, the assistance or charging can be performed using the motor 7 by driving the motor 7 and by applying the motor torque in the forward rotation direction or by applying the regenerative torque in the reverse rotation direction.

Then, from the 3rd Post 2 mode, when the second transmission shifter 52 is in-gear engaged from the second-speed connection position to the neutral position as shown in FIG. 12(a), a 3rd mode is obtained.

Figure 11:
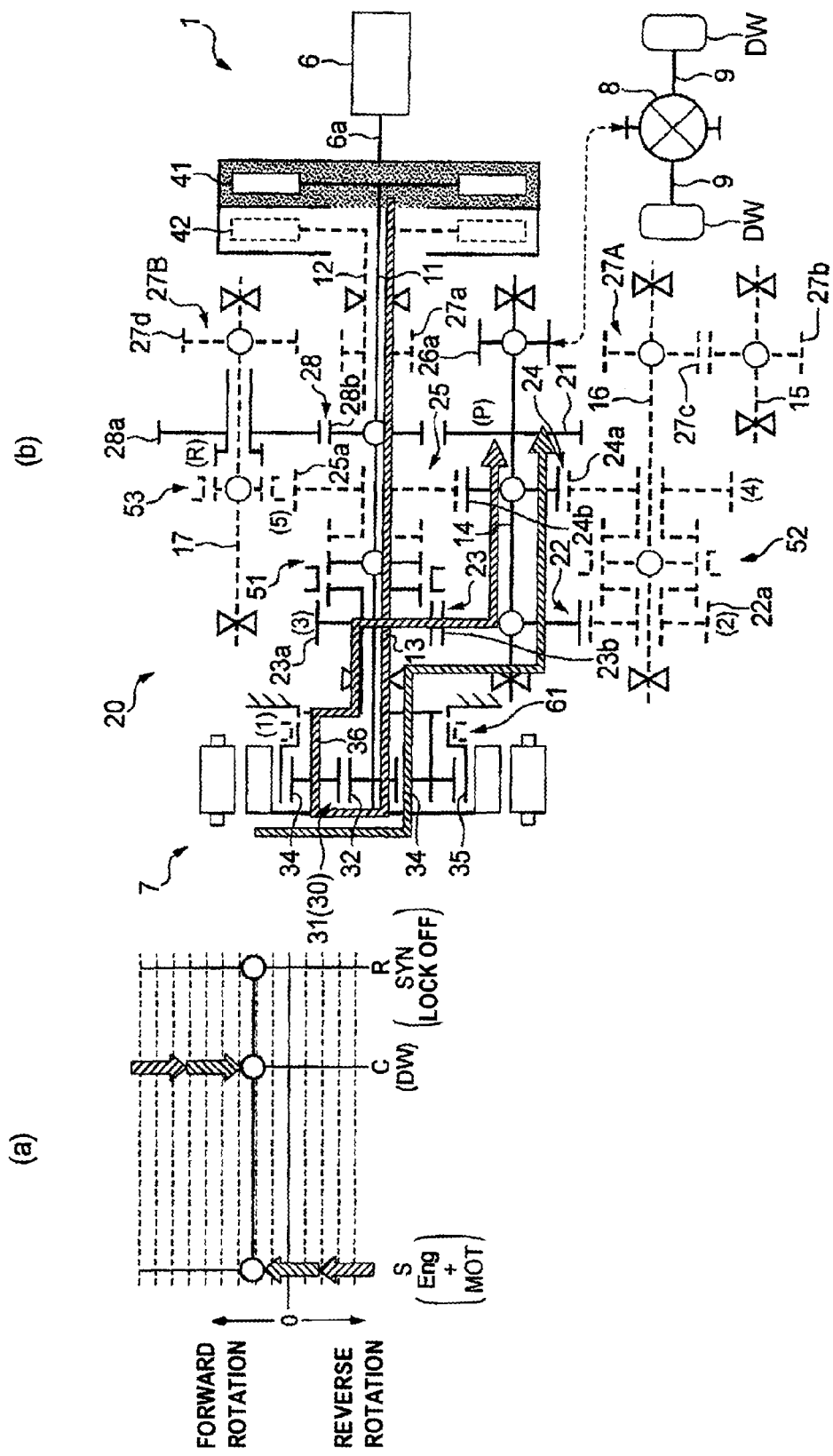
FIG. 11 is a view showing a state when assistance is provided in a 3rd mode.

FIG. 11 is a view showing a case in which the motor 7 provides assistance during traveling in the 3rd mode. From this state, when the motor 7 is driven to apply the motor torque in the forward rotation direction, the motor torque is transmitted to the drive wheels DW and DW through the fourth transmission path passing through the third-speed gear pair 23 directly without being subjected to speed reduction. In other words, the engine torque and the motor torque are transmitted to the third-speed gear pair 23, and the combined torque is transmitted to the drive wheels DW and DW. On the other hand, when the motor 7 is not driven and the regenerative torque in the reverse rotation direction is applied to the motor 7, charging can be performed by the motor 7.

Figure 12:
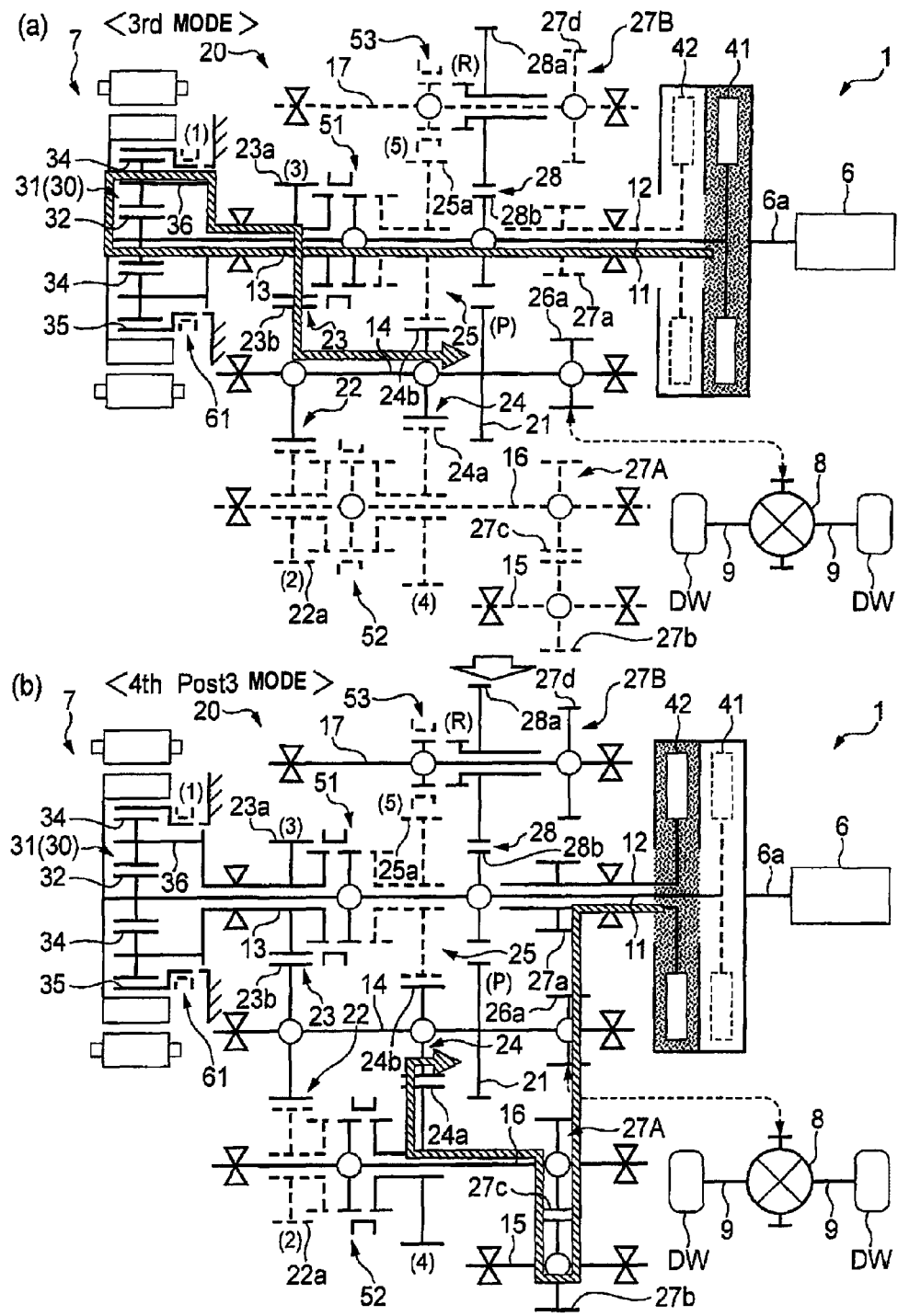
FIG. 12(a) is a view showing the state of torque transmission in the vehicle drive unit in the 3rd mode.
FIG. 12(b) is a view showing the state of torque transmission in a 4th Post 3 mode.

Next, shift-up control from the third-speed traveling to fourth-speed traveling will be described. First, from the state of the 3rd mode shown in FIG. 12(a), the second transmission shifter 52 is in-gear engaged from the neutral position to its fourth-speed connection position. The state in which the second transmission shifter 52 is pre-shifted to the fourth-speed connection position during the third-speed traveling is hereafter referred to as 3rd Pre 4 mode. Even in this state, assistance or charging can be performed using the motor 7 by driving the motor 7 and by applying the motor torque in the forward rotation direction or by applying the regenerative torque in the reverse rotation direction. Furthermore, when the engagement states of the first and second clutches 41 and 42 are changed, that is, when the first clutch 41 is disengaged and the second clutch 42 is engaged, the engine torque is transmitted to the drive wheels DW and DW through the second transmission path passing through the above-mentioned fourth-speed gear pair 24 as shown in FIG. 12(*b*), whereby the fourth-speed traveling is performed. The state shown in FIG. 12(*b*) in which the first transmission shifter 51 remains in-gear engaged at the third-speed connection position during the fourth-speed traveling is hereafter referred to as 4th Post 3 mode. At this time, by the engagement between the third-speed drive gear 23*a* and the first common driven gear 23*b*, the rotation speed of the motor 7 is increased through the third-speed gear pair 23 and the planetary gear mechanism 31 as viewed from the counter shaft 14, and the motor 7 is rotated together at a rotation speed higher than the rotation speed of the counter shaft 14.

Figure 13:
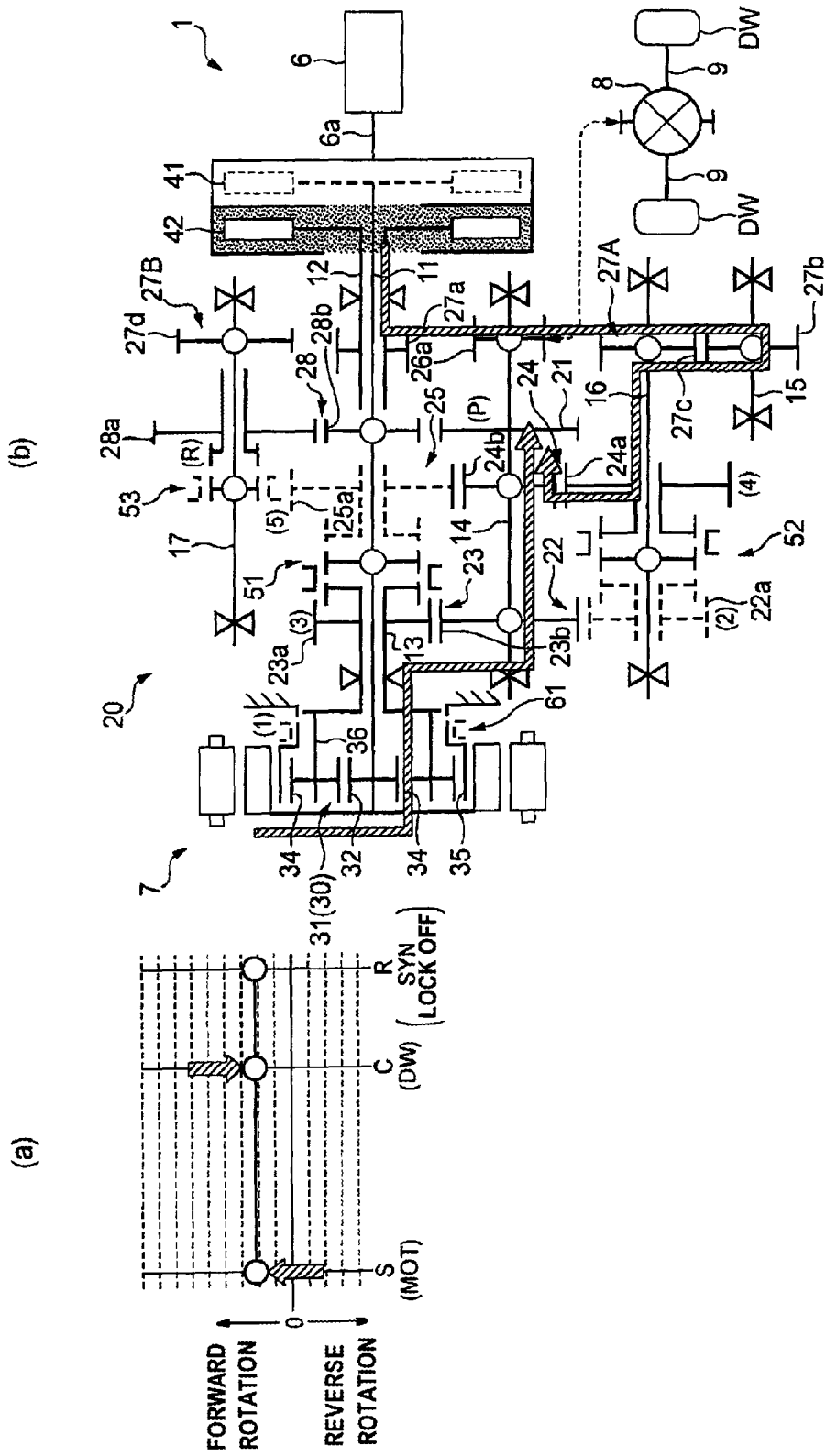
FIG. 13 is a view showing a state when assistance is provided in the 4th Post 3 mode.

FIG. 13 is a view showing a case in which the motor 7 provides assistance during traveling in the 4th Post 3 mode. From this state, when the motor 7 is driven to apply the motor torque in the forward rotation direction, the motor torque is directly transmitted to the drive wheels DW and DW through the fourth transmission path passing through the above-mentioned third-speed gear pair 23. On the other hand, when the motor 7 is not driven and the regenerative torque in the reverse rotation direction is applied to the motor 7, charging can be performed by the motor 7.

Figure 16:
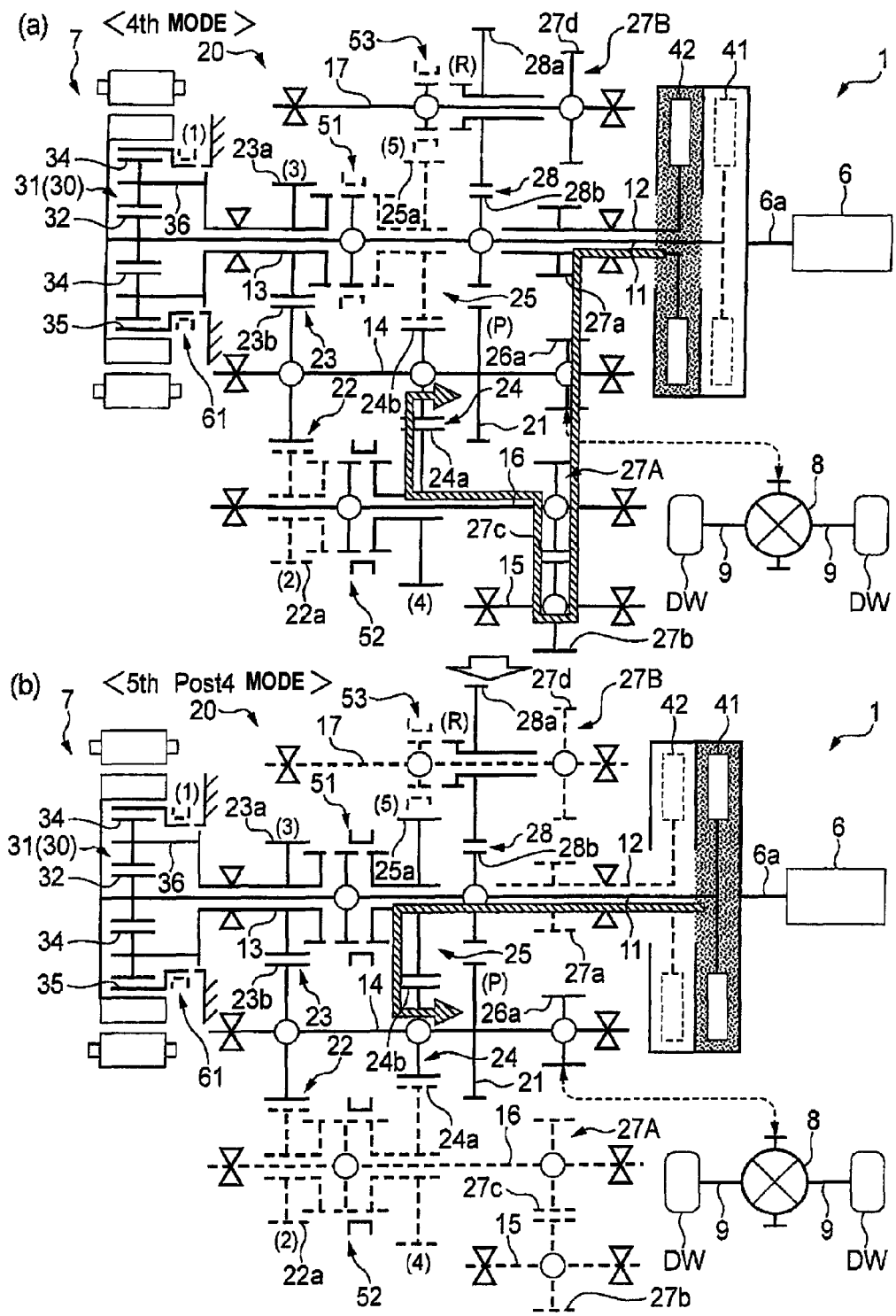
FIG. 16(a) is a view showing the state of torque transmission in the vehicle drive unit in the 4th mode.
FIG. 16(b) is a view showing the state of torque transmission in the vehicle drive unit in a 5th Post 4 mode.

Then, when the first transmission shifter 51 is in-gear engaged from the third-speed connection position to the neutral position as shown in FIG. 16(*a*) from the 4th Post 3 mode, a 4th mode is obtained. In this 4th mode, since the first clutch 41 is disengaged and the locking of the synchromesh mechanism 61 is released, the sun gear 32 and the ring gear 35 rotate idly, and the motor 7 is disengaged.

Furthermore, in addition to the configuration shown in FIG. 16(*a*), the 4th mode has a configuration in which the first clutch 41 remains engaged and the second clutch 42 is engaged, instead of changing the engagement states of the first and second clutches 41 and 42 from the 3rd Pre 4 mode.

Figure 14:
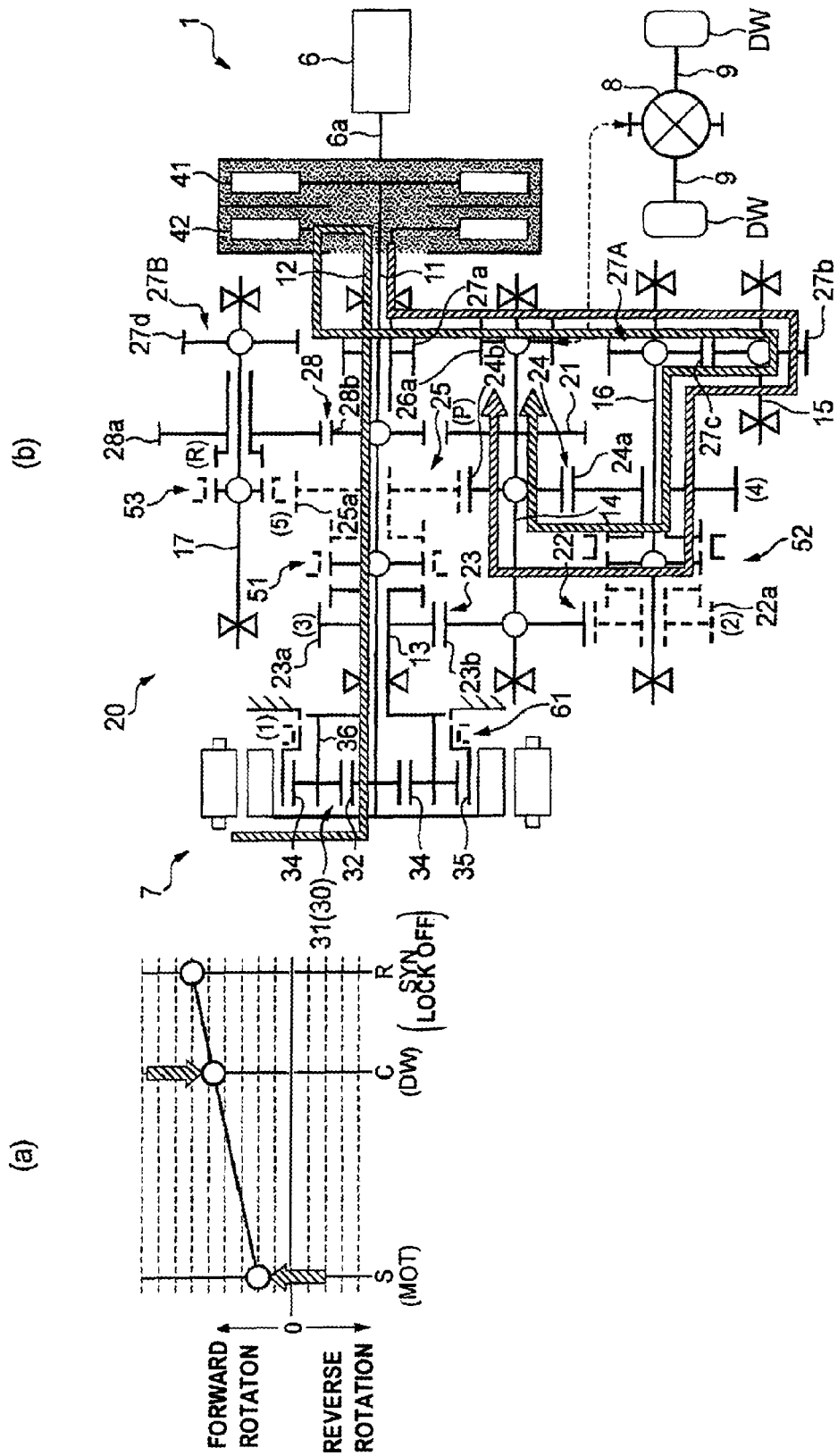
FIG. 14 is a view showing a state when assistance is provided in a 4th mode (both the clutches are engaged)

FIG. 14 shows a case in which the motor 7 provides assistance during traveling in the 4th mode in which both the first and second clutches 41 and 42 are engaged (both the clutches are engaged). From this state, when the motor is driven to apply the motor torque in the forward rotation direction, the combined torque of the motor torque and the engine torque is transmitted to the drive wheels DW and DW through the second transmission path passing through the fourth-speed gear pair 24. On the other hand, when the motor 7 is not driven and the regenerative torque in the reverse rotation direction is applied to the motor 7, charging can be performed by the motor 7. In the case that both the first and second clutches 41 and 42 are engaged, the sun gear 32 is rotated at the reduction ratio of the fourth speed and the carrier 36 is rotated at the reduction ratio of the third speed, whereby a constant differential rotation occurs in the planetary gear mechanism 31 as shown in FIG. 14(*a*).

Next, shift-up control from the fourth-speed traveling to fifth-speed traveling will be described. First, from the 4th mode shown in FIG. 16(*a*), the first transmission shifter 51 is in-gear engaged from the neutral position to its fifth-speed connection position. The state in which the first transmission shifter 51 is pre-shifted to the fifth-speed connection position during the fourth-speed traveling is hereafter referred to as 4th Pre 5 mode.

Figure 15:
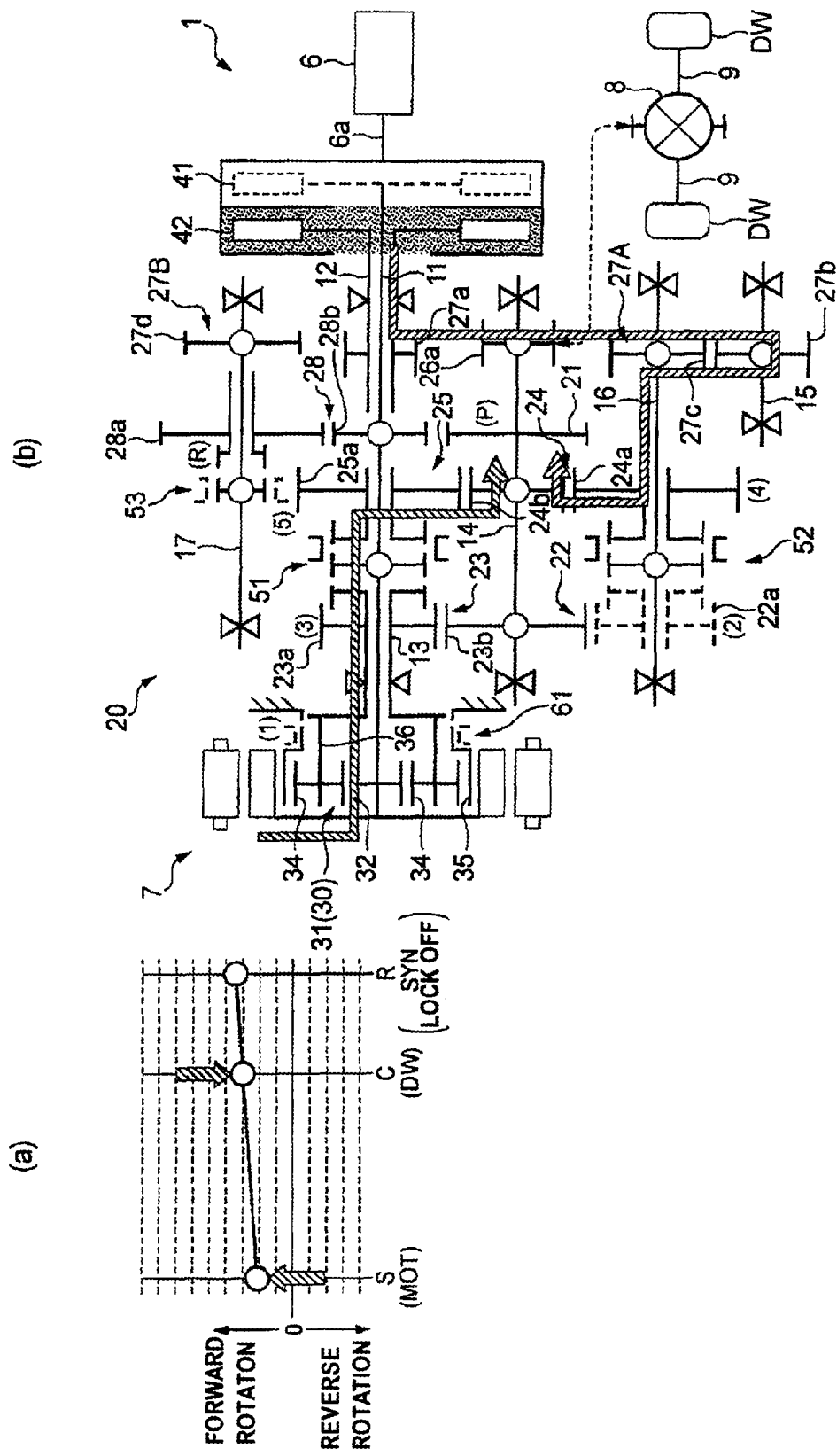
FIG. 15 is a view showing a state when assistance is provided in a 4th Pre 5 mode.

FIG. 15 is a view showing a case in which the motor 7 provides assistance during traveling in the 4th Pre 5 mode. From this state, when the motor 7 is driven to apply the motor torque in the forward rotation direction, the motor torque is input to the sun gear 32, the motor torque is transmitted from the sun gear 32 to the carrier 36 while being subjected to acceleration, and the motor torque is transmitted to the drive wheels DW and DW through the fourth transmission path passing through the above-mentioned fifth-speed gear pair 25. On the other hand, when the motor 7 is not driven and the regenerative torque in the reverse rotation direction is applied to the motor 7, charging can be performed by the motor 7. In this state, the sun gear 32 is rotated at the reduction ratio of the fifth speed and the carrier 36 is rotated at the reduction ratio of the third speed, whereby a constant differential rotation occurs in the planetary gear mechanism 31 as shown in FIG. 15(*a*).

Then, when the engagement states of the first and second clutches 41 and 42 are changed, that is, when the second clutch 42 is disengaged and the first clutch 41 is engaged, the engine torque is transmitted to the drive wheels DW and DW through the third transmission path passing through the fifth-speed gear pair 25, whereby the fifth-speed traveling is performed as shown in FIG. 16(*b*). The state shown in FIG. 16(*b*) in which the second transmission shifter 52 remains in-gear engaged at the fourth connection position during the fifth-speed traveling is hereafter referred to as 5th Post 4 mode. Even in this state, the assistance or charging can be performed using the motor 7 by driving the motor 7 and by applying the motor torque in the forward rotation direction or by applying the regenerative torque in the reverse rotation direction.

Then, from the 5th Post 4 mode, when the second transmission shifter 52 is in-gear engaged from the fourth-speed connection position to the neutral position, a 5th mode is obtained.

Figure 17:
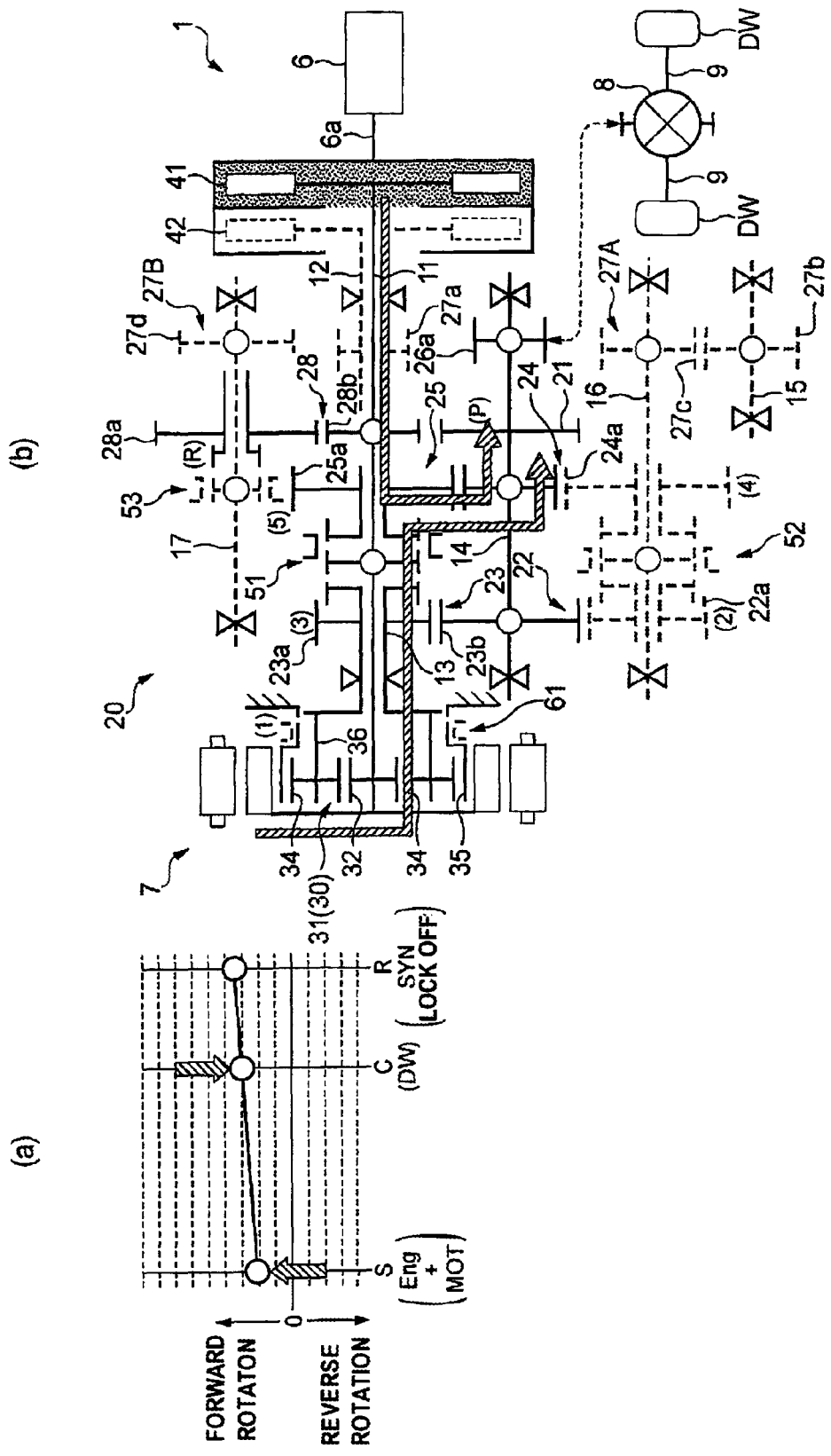
FIG. 17 is a view showing a state when assistance is provided in a 5th mode.

FIG. 17 is a view showing a case in which the motor 7 provides assistance during traveling in the 5th mode. From this sate, when the motor 7 is driven to apply the motor torque in the forward rotation direction, the motor torque is transmitted to the drive wheels DW and DW through the fourth transmission path passing through the fifth-speed gear pair 25. In other words, the engine torque and the motor torque are transmitted to the fifth-speed gear pair 25, and the combined torque is transmitted to the drive wheels DW and DW. On the other hand, when the motor 7 is not driven and the regenerative torque in the reverse rotation direction is applied to the motor 7, charging can be performed by the motor 7. In this state, the sun gear 32 is rotated at the reduction ratio of the fifth speed and the carrier 36 is rotated at the reduction ratio of the third speed, whereby a constant differential rotation occurs in the planetary gear mechanism 31 as shown in FIG. 17(*a*).

Next, reverse traveling in the vehicle drive unit 1 will be described.

For the reverse traveling of a vehicle, a case in which the engine 6 is used and a case in which EV traveling is performed for reverse traveling are available; the case in which the engine 6 is used is herein described, and the case in which EV traveling is performed for reverse traveling will be described later together with the description of EV traveling.

The reverse traveling in the case that only the torque of the engine 6 is used is accomplished by in-gear engaging the reverse shifter 53 at the reverse connection position from the initial state, by locking the synchromesh mechanism 61 and by engaging the second clutch 42. Hence, the torque of the engine 6 is transmitted to the drive wheels DW and DW through the above-mentioned fifth-speed transmission path. Even in this state, when the motor 7 is driven to apply the motor torque in the reverse rotation direction or when the regenerative torque is applied in the forward rotation direction, assistance or charging can be performed using the motor 7.

Next, EV traveling will be described.

The vehicle drive unit 1 has three EV traveling modes.

A first EV traveling mode is a 1st EV mode that is performed by locking (OWC lock ON) the synchromesh mechanism 61 from the initial state.

Figure 18:
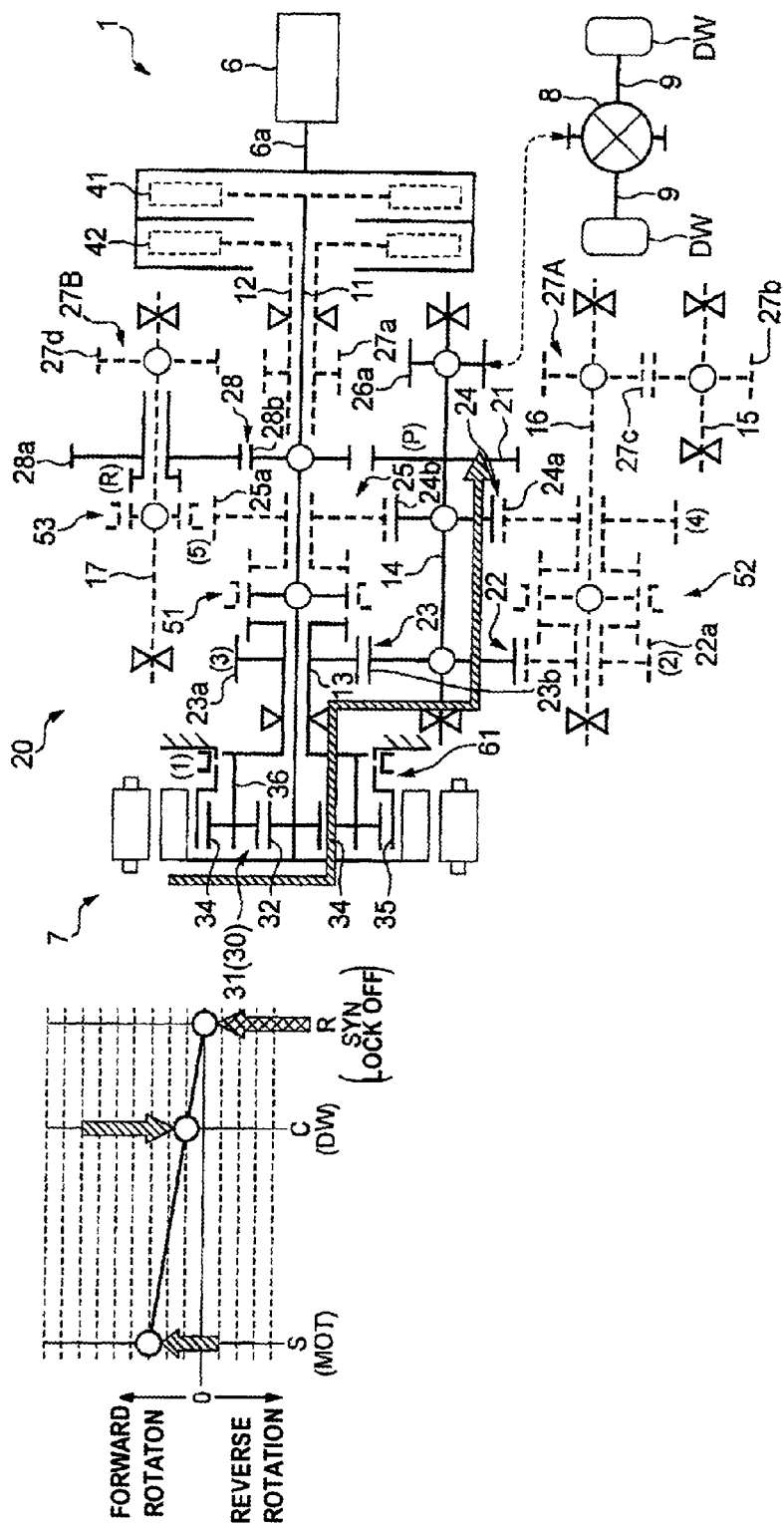
FIG. 18 is a view showing a state in a 1st EV mode.

In this state, when the motor 7 is driven (the torque is applied in the forward rotation direction), the sun gear 32 of the planetary gear mechanism 31 connected to the rotor 72 is rotated in the forward rotation direction as shown in FIG. 18($a$). At this time, as shown in FIG. 18($b$), since the first and second clutches 41 and 42 are disengaged, the power transmitted to the sun gear 32 is not transmitted from the main shafts 11 to the crankshaft 6$a$ of the engine 6. In addition, since the synchromesh mechanism 61 is locked, the motor torque is transmitted from the sun gear 32 to the carrier 36 while being subjected to speed reduction and transmitted to the drive wheels DW and DW through the fourth transmission path passing through the third-speed gear pair 23.

Furthermore, the reverse traveling in the 1st EV mode is performed by driving the motor 7 in the reverse rotation direction and by applying the motor torque in the reverse rotation direction.

A second EV traveling mode is a 3rd EV mode that is performed by in-gear engaging the first transmission shifter from the neutral position to the third-speed connection position from the initial state. When the first transmission shifter 51 is in-gear engaged at the third-speed connection position as described above, the components of the planetary gear mechanism 31 are integrated.

Figure 19:
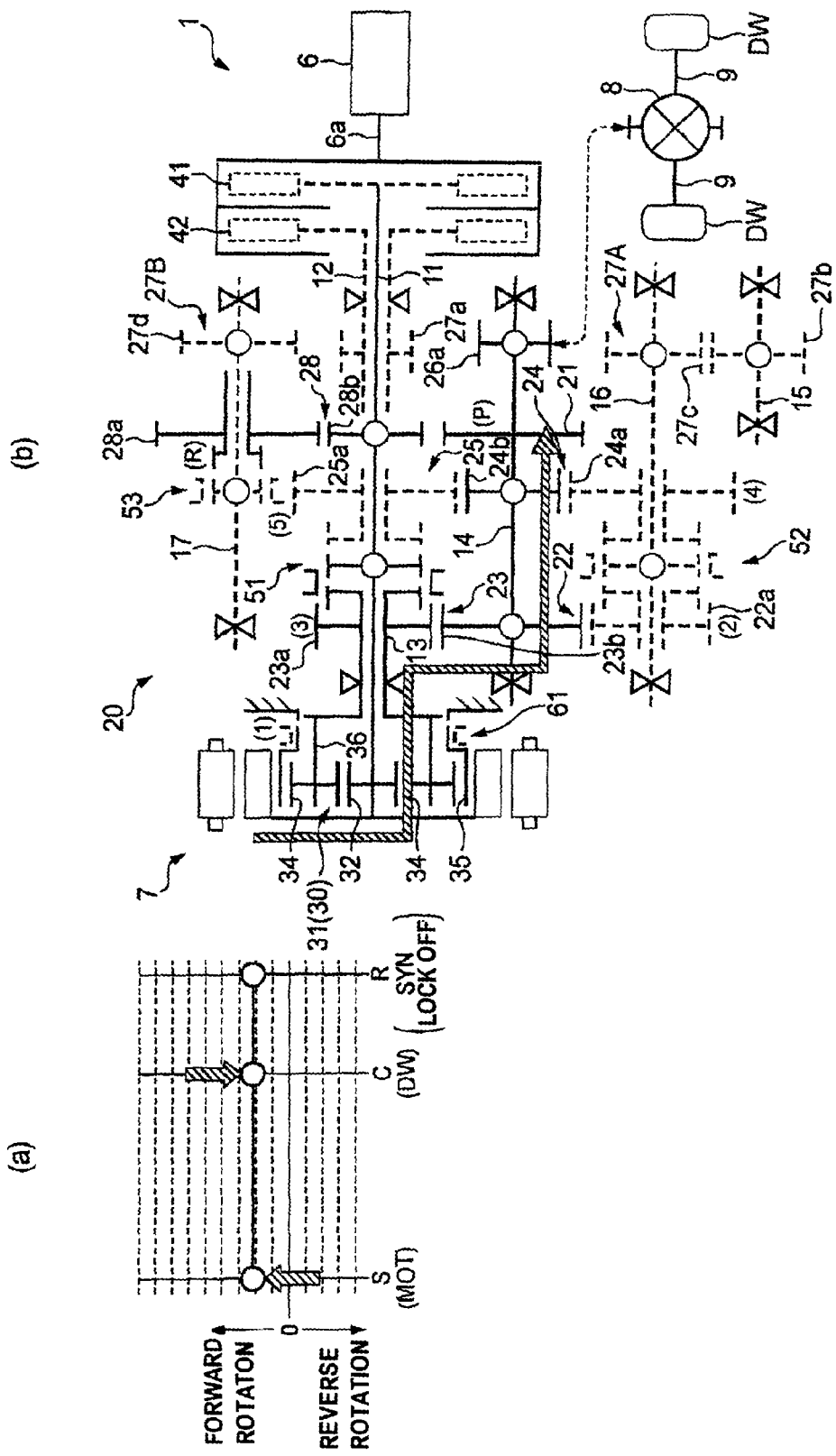
FIG. 19 is a view showing a state in a 3rd EV mode.

In this state, when the motor 7 is driven (the torque is applied in the forward rotation direction), the components of the planetary gear mechanism 31 connected to the rotor 72 are rotated integrally in the forward rotation direction as shown in FIG. 19($a$). At this time, since the first and second clutches 41 and 42 are disengaged, the power transmitted to the sun gear 32 is not transmitted from the first main shaft 11 to the crankshaft 6$a$ of the engine 6. In addition, the motor torque is transmitted to the drive wheels DW and DW through the fourth transmission path passing through the third-speed gear pair 23.

Furthermore, the reverse traveling in the 3rd EV mode is performed by driving the motor 7 in the reverse rotation direction and by applying the motor torque in the reverse rotation direction.

A third EV traveling mode is a 5th EV mode that is performed by in-gear engaging the first transmission shifter from the neutral position to the fifth-speed connection position from the initial state.

Figure 20:
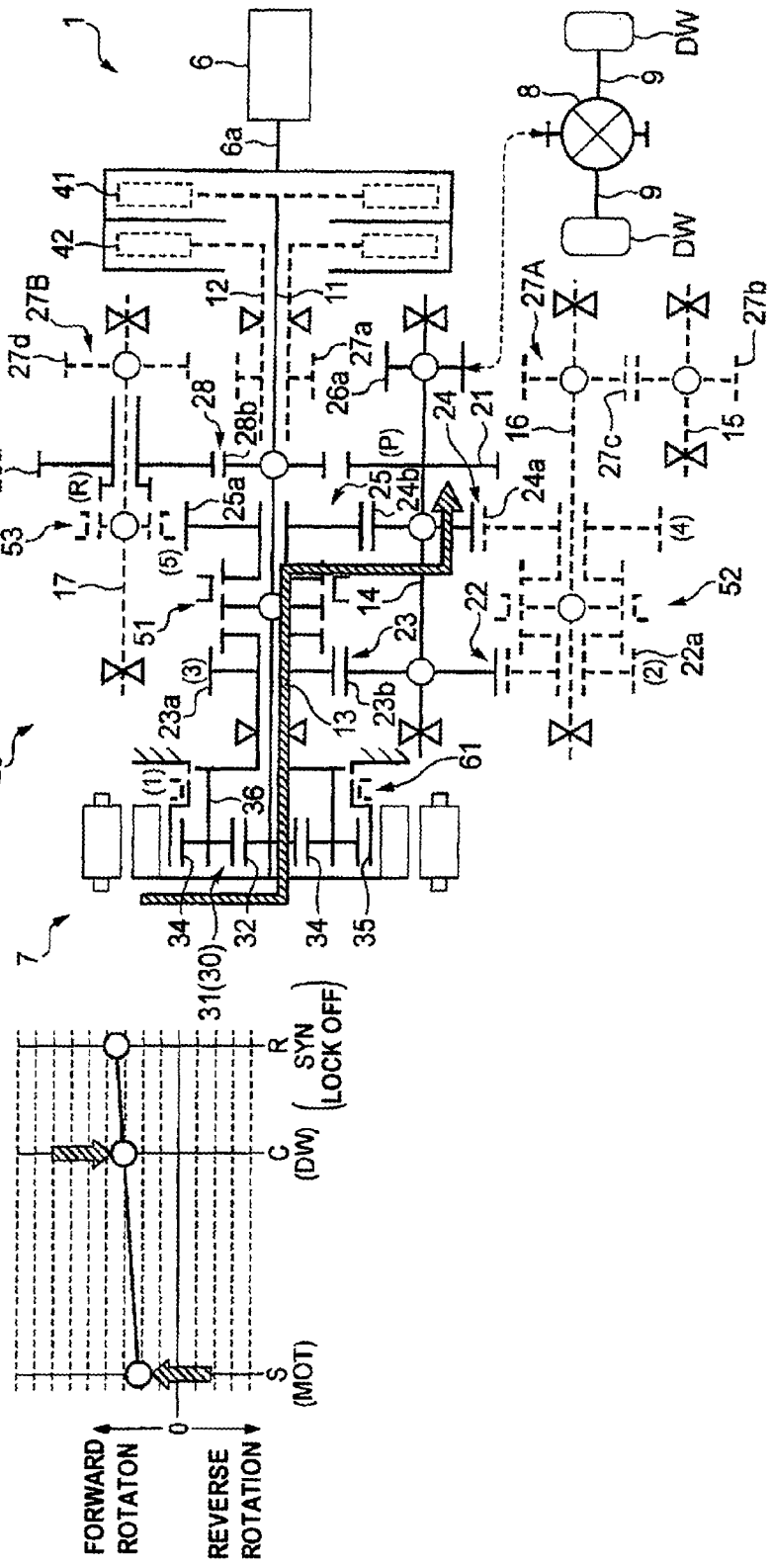
FIG. 20 is a view showing a state in a 5th EV mode.

In this state, when the motor 7 is driven (the torque is applied in the forward rotation direction), the sun gear 32 of the planetary gear mechanism 31 connected to the rotor 72 is rotated in the forward rotation direction as shown in FIG. 20($a$). At this time, as shown in FIG. 20($b$), since the first and second clutches 41 and 42 are disengaged, the power transmitted to the sun gear 32 is not transmitted from the main shafts 11 to the crankshaft 6$a$ of the engine 6. In addition, the motor torque is transmitted to the drive wheels DW and DW through the fourth transmission path passing through the fifth-speed gear pair 25.

Furthermore, the reverse traveling in the 5th EV mode is performed by driving the motor 7 in the reverse rotation direction and by applying the motor torque in the reverse rotation direction.

Figure 21:
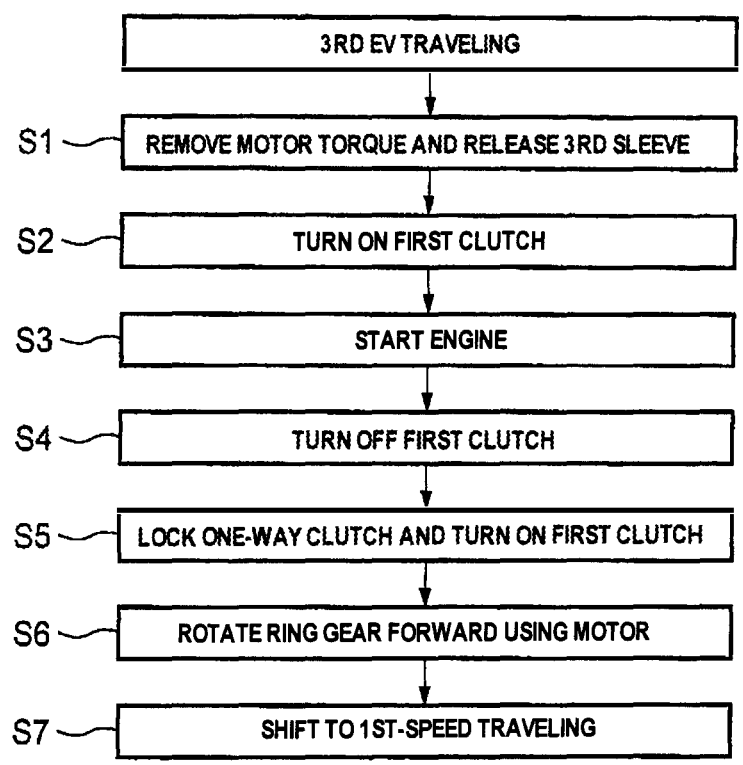
FIG. 21 is a flowchart showing a case in which the engine is started during EV traveling.

Next, a case in which the EV traveling in the 3rd EV mode at a very low speed is changed to engine traveling will be described referring to the flowchart shown in FIG. 21.

First, during traveling in the 3rd mode shown in FIG. 19, the torque of the motor 7 is removed and the first transmission shifter 51 having been in-gear engaged at the third-speed connection position is returned to the neutral position (at S1). Next, the first clutch 41 is engaged (at S2), and the crankshaft 6$a$ is cranked to start the engine 6 (at S3). Then, the first clutch 41 is disengaged (at S4), the synchromesh mechanism 61 is locked, and the first clutch 41 is engaged (at S5); at the same time, the motor torque is increased to rotate the ring gear 35 in the forward rotation direction (at S6). As a result, the traveling in the 3rd EV mode can be shifted to the first-speed traveling (1st mode assist) shown in FIG. 5 (at S7).

Instead of starting the engine 6 by engaging the first clutch 41, the engine 6 can be started by engaging the second clutch 42 and by in-gear engaging the second transmission shifter 52 at the second-speed connection position or the fourth-speed connection position.

Next, a case in which charging is performed during the stop (idling) of the vehicle will be described.

Figure 22:
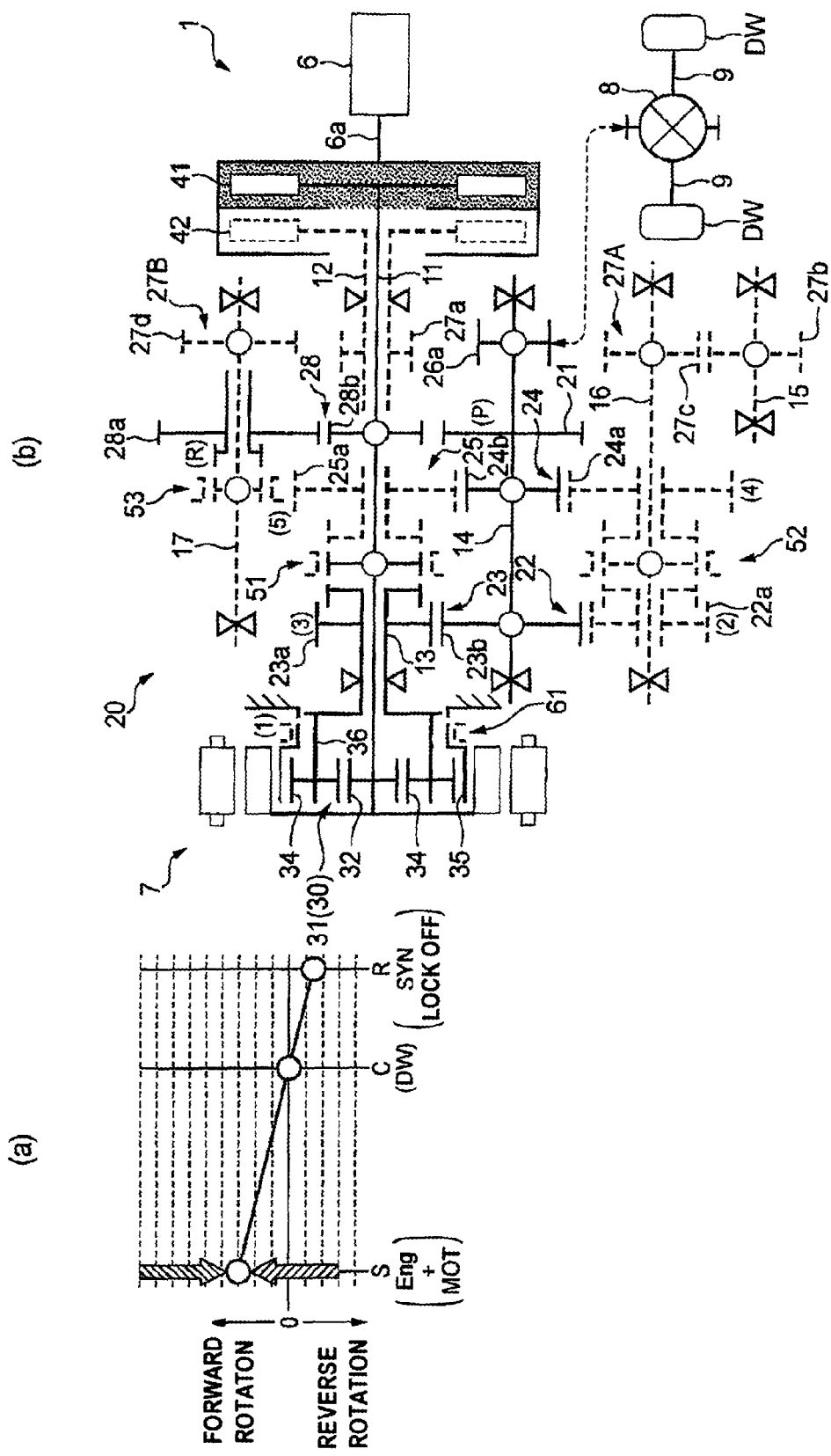
FIG. 22 is a view showing a state when charging is performed during idling.

In the case in which charging is performed during the stop (idling) of the vehicle, when the first clutch 41 is engaged from the initial state and the engine torque is increased from the idling state, the motor 7 directly connected to the sun gear 32 is rotated in the forward rotation direction and the torque is applied in the reverse rotation direction as shown in FIG. 22, whereby the charging is performed. At this time, since the locking of the synchromesh mechanism 61 is released, the ring gear 35 rotates idly and the torque is not transmitted to the carrier 36.

Figure 23:
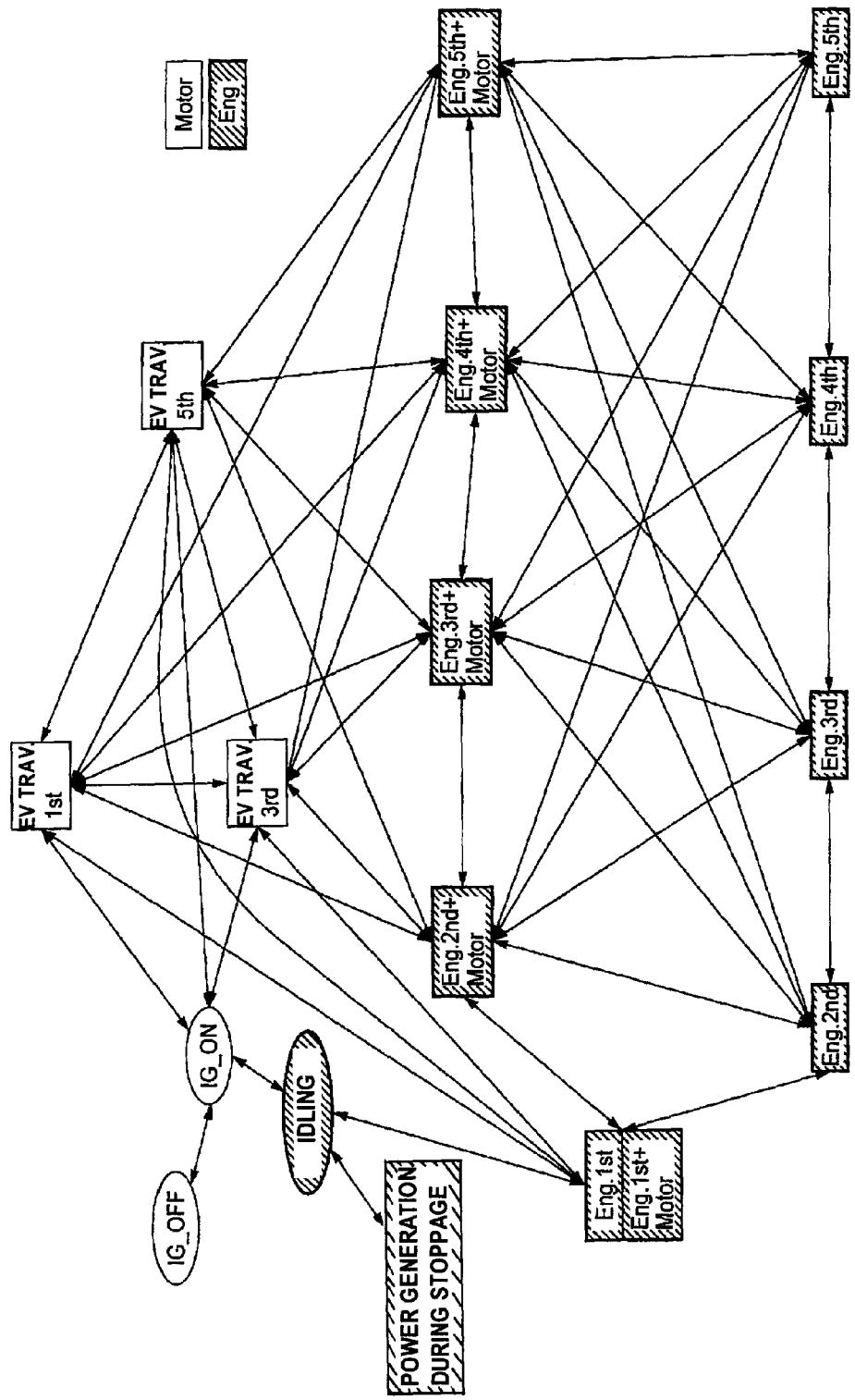
FIG. 23 is an explanatory view explaining shifting among respective modes in the vehicle drive unit shown in FIG. 1.

Although the case in which the shift change is performed one speed at a time is described in the above-mentioned embodiment, without being limited to this, the speed change can be performed and assistance or charging can be performed depending on the speed or the required torque of the vehicle as shown in FIG. 23.

In the above-mentioned operation control, as described above, in the 2nd Post 1 mode shown in FIG. 7($b$) and the 4th Post 3 mode shown in FIG. 13($b$), the rotation speed of the motor 7 is increased as viewed from the counter shaft 14 through the third-speed gear pair 23 and the planetary gear mechanism 31, and the motor 7 rotates at a rotation speed higher than the rotation speed of the counter shaft 14.

In the embodiment, at this time, the ECU 5 outputs a control command (hereafter referred to as pre-shift control) for causing the first transmission shifter 51 to be pre-shifted to a gear of the odd-number stage gear group from a gear of the even-number stage gear group with which the second transmission shifter 52 is in-gear engaged so that the rotation speed of the motor 7 detected by the motor rotation speed detecting device 8 does not exceed a predetermined rotation speed.

More specifically, in the 2nd Post 1 mode shown in FIG. 7($b$), when the rotation speed of the motor 7 becomes close to the predetermined rotation speed, the locking state of the synchromesh mechanism 61 is released and the first transmission shifter 51 is in-gear engaged at the third-speed connection position, whereby the traveling mode is shifted to the assistance traveling in the 2nd Post 3 mode shown in FIG. 9. As a result, the motor 7 rotates at the rotation speed in the 2nd Post 3 mode lower than the rotation speed in the 2nd Post 1 mode, whereby over speed rotation of the motor 7 due to the shift change can be prevented and the load on the motor 7 can be reduced.

Similarly, in the 4th Post 3 mode shown in FIG. 13(*b*), when the rotation speed of the motor 7 becomes close to the predetermined rotation speed, the first transmission shifter is in-gear engaged from the third-speed connection position to the fifth-speed connection position, whereby the traveling mode is shifted to the assistance traveling in the 4th Pre 5 mode shown in FIG. 15. As a result, the motor 7 rotates at the rotation speed in the 4th Post 3 mode lower than the rotation speed in the 4th Post 3 mode, whereby over speed rotation of the motor 7 due to the shift change can be prevented and the load on the motor 7 can be reduced.

Figure 25:
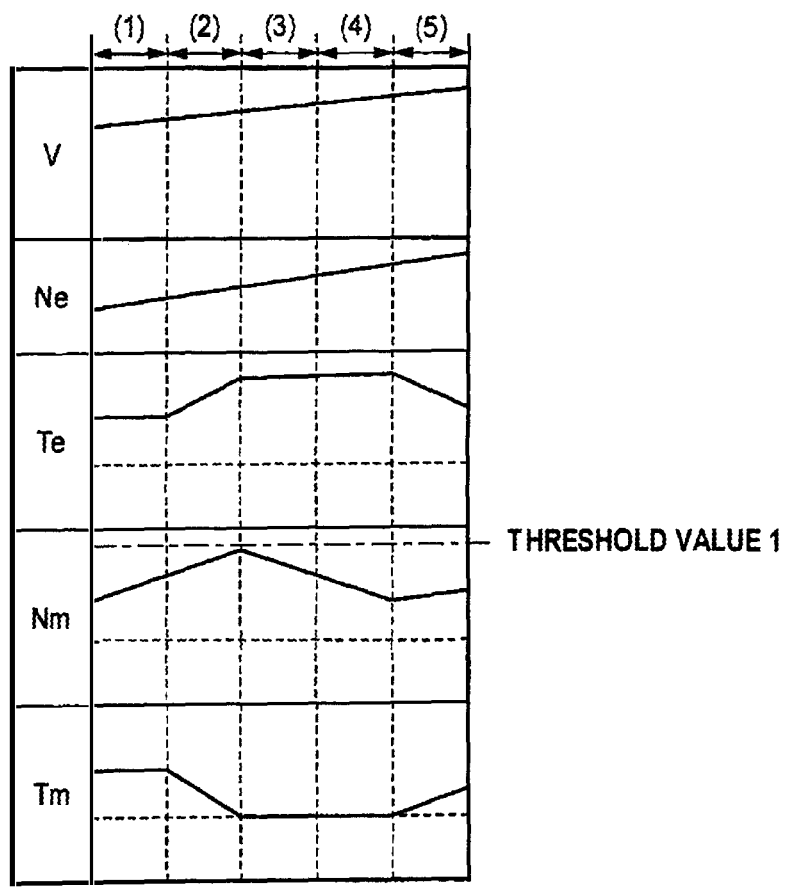
FIG. 25 is a graph showing the changes in the vehicle speed, the rotation speed of the engine, the torque of the engine, the rotation speed of the motor and the torque of the motor in pre-shift control.

FIG. 25 is a graph showing the changes in the vehicle speed, the rotation speed of the engine, the torque of the engine, the rotation speed of the motor and the torque of the motor when shifting is performed from the 4th Post 3 mode to the 4th Pre 5 mode in the vehicle incorporating the vehicle drive unit. In the graph, V represents the vehicle speed, Ne represents the rotation speed of the engine, Te represents the torque of the engine, Nm represents the rotation speed of the motor, and Tm represents the torque of the motor.

The area (1) in the graph shows a state in which the assistance traveling in the 4th Post 3 mode shown in FIG. 13(*b*) is performed. When the rotation speed of the motor becomes close to a threshold value 1 as the speed of the vehicle rises, the torque of the motor 7 is removed in the area (2). Hence, the rotation speed of the engine is raised. Furthermore, from the engine traveling in the 4th Post 3 mode, in the area (3), the first transmission shifter 51 is returned to the neutral position so that the rotation speed of the motor does not exceed the threshold value 1. At this time, the vehicle drive unit 1 is in the state of the 4th mode shown in FIG. 16(*a*). The area (4) shows a state in which the rotation speed of the motor 7 is adjusted from the state shown in the area (3); when the first transmission shifter 51 is in-gear engaged at the fifth-speed connection position in the area (5), the traveling is shifted to the assistance traveling in the 4th Pre 5 mode shown in FIG. 15. Hence, the over speed rotation state of the motor 7 can be suppressed although the speed of the vehicle is increased.

As described above, in the controller according to the embodiment, while a gear of the gear group not used to transmit the power of the motor 7 is used for driving, pre-shifting is performed so as to select a gear being on a higher speed side than the gear being used for driving from among the gear group capable of transmitting the power of the motor 7 so that the rotation speed of the rotating motor 7 does not exceed the predetermined rotation speed, whereby over speed rotation of the motor 7 due to the shift change can be prevented and the load on the motor 7 can be reduced.

In the embodiment, although the pre-shift control is performed on the basis of the rotation speed of the motor 7, without being limited to this, the pre-shift control may be performed so that the synchronous position detecting device detects the synchronous position of the first transmission shifter 51 and so that the motor 7 rotates within the vehicle speed range or the rotation speed range of the first main shaft 11 or the counter shaft 14 pre-determined depending on the synchronous position of the first transmission shifter 51.

Furthermore, in the pre-shift control, it is preferable that the pre-shift timing should be corrected depending on the temperature of the motor. For example, in FIG. 25, even in the case that the rotation speed of the motor 7 is lower than the threshold value 1, in the case that the temperature of the motor 7 detected by the motor temperature detecting device 9 is higher than a pre-determined temperature, the motor 7 being in the high temperature state can be prevented from rotating at high speed by in-gear engaging the first transmission shifter 51 from the third-speed connection position to the fifth-speed connection position. However, the motor temperature detecting device 9 is not limited to devices for directly detecting the temperature of the motor, but the device may detect the value of the current, thereby estimating the temperature of the motor 7.

Furthermore, in the case that the rotation speed of the motor exceeds the pre-determined rotation speed or the temperature of the motor 7 exceeds the pre-determined temperature although the first transmission shifter 51 is in-gear engaged from the third-speed connection position to the fifth-speed connection position during the traveling in the 4th Post 3 mode, it is preferable that the ECU 5 should have a fail time control function for shifting the first transmission shifter 51 to the neutral state. With this function, when the motor 7 or the control circuit of the motor 7 is abnormal, the rotation speed of the motor 7 can be lowered or the temperature of the motor 7 can be lowered.

Figure 26:
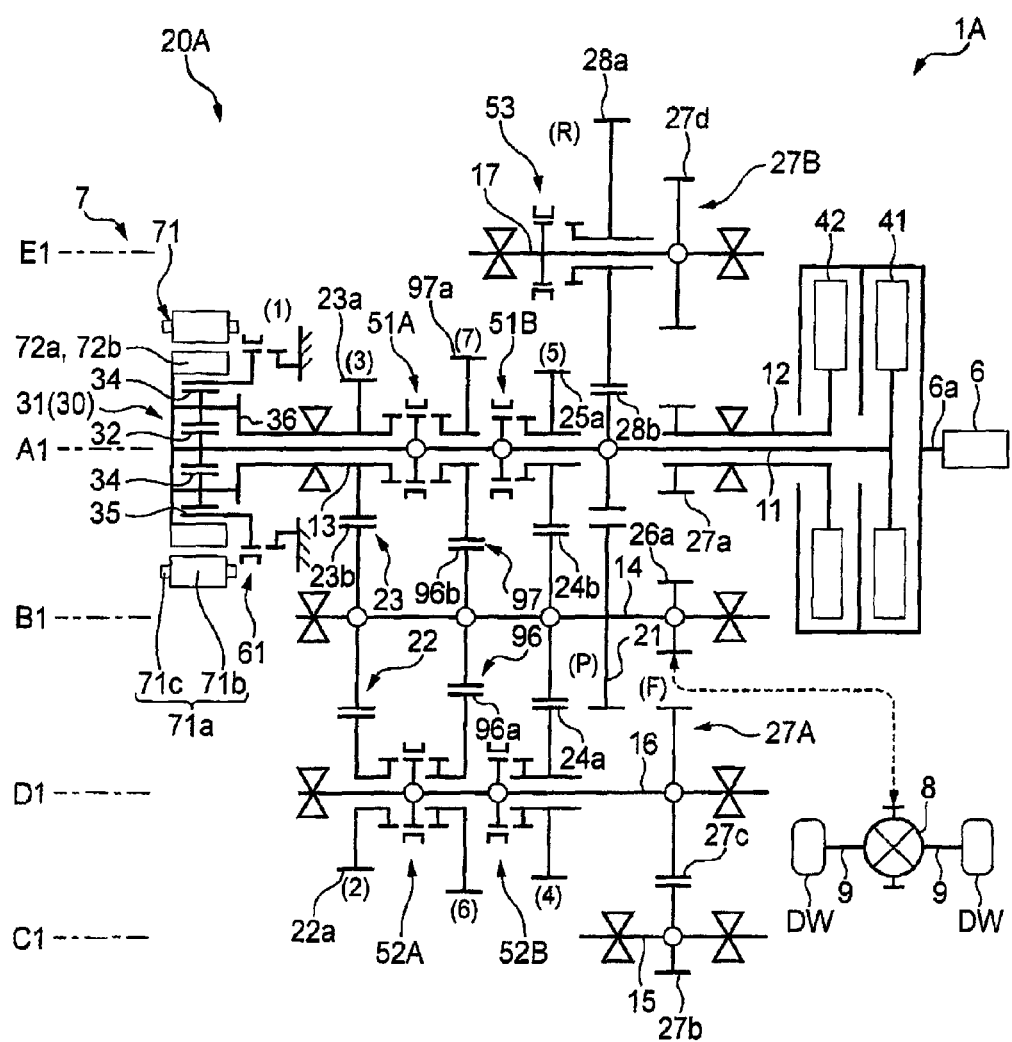
FIG. 26 is a schematic view showing a first modified embodiment of the vehicle drive unit to which the controller according to the present invention is applicable.

Next, a first modified embodiment of the vehicle drive unit will be described referring to FIG. 26. A vehicle drive unit 1A is different from the vehicle drive unit 1 in that the transmission 20A thereof is equipped with a sixth-speed gear pair 96 and a seventh-speed gear pair 97 in addition to the planetary gear mechanism 31 constituting the differential reduction gear 30 and the second- to fifth-speed gear pairs 22 to 25. In the description of this vehicle drive unit 1A, only the differences from the above-mentioned vehicle drive unit 1 will be described below.

A seventh-speed drive gear 97*a* is provided on the first main shaft 11 between the third-speed drive gear 23*a* and the fifth-speed drive gear 25*a* so as to be rotatable relatively with the first main shaft 11. Furthermore, a first transmission shifter 51A is provided to connect or release the first main shaft 11 to or from the third-speed drive gear 23*a* or the seventh-speed drive gear 97*a* between the third-speed drive gear 23*a* and the seventh-speed drive gear 97*a*, and a third transmission shifter 51B is provided to connect or release the first main shaft 11 to or from the fifth-speed drive gear 25*a* between the seventh-speed drive gear 97*a* and the fifth-speed drive gear 25*a*. In addition, when the first transmission shifter 51A is in-gear engaged at its third-speed connection position, the first main shaft is connected to the third-speed drive gear 23*a* so that they rotate integrally; when the first transmission shifter 51A is in-gear engaged at its seventh-speed connection position, the first main shaft 11 and the seventh-speed drive gear 97*a* rotate integrally; when the first transmission shifter 51A is at its neutral position, the first main shaft 11 rotates relatively with the third-speed drive gear 23*a* and the seventh-speed drive gear 97*a*. Moreover, when the third transmission shifter 51B is in-gear engaged at its fifth-speed connection position, the first main shaft 11 and the fifth-speed drive gear 25*a* rotate integrally; and when the third transmission shifter 51B is at its neutral position, the first main shaft 11 rotates relatively with the fifth-speed drive gear 25*a*.

A sixth-speed drive gear 96*a* is provided on the second intermediate shaft 16 between the second-speed drive gear 22*a* and the fourth-speed drive gear 24*a* so as to be rotatable relatively with the second intermediate shaft 16. Furthermore, a second transmission shifter 52A is provided to connect or release the second intermediate shaft 16 to or from the second-speed drive gear 22*a* or the sixth-speed drive gear 96*a* between the second-speed drive gear 22*a* and the sixth-speed drive gear 96*a*, and a fourth transmission shifter 52B is provided to connect or release the second intermediate shaft 16 to or from the fourth-speed drive gear 24*a* between the sixth-speed drive gear 96a and the fourth-speed drive gear 24a. In addition, when the second transmission shifter 52A is in-gear engaged at its second-speed connection position, the second intermediate shaft 16 is connected to the second-speed drive gear 22a so that they rotate integrally; when the second transmission shifter 52A is in-gear engaged at its sixth-speed connection position, the second intermediate shaft 16 and the sixth-speed drive gear 96a rotate integrally; when the second transmission shifter 52A is at its neutral position, the second intermediate shaft 16 rotates relatively with the second-speed drive gear 22a and the sixth-speed drive gear 96a. Moreover, when the fourth transmission shifter 52B is in-gear engaged at its fourth-speed connection position, the second intermediate shaft 16 is connected to the fourth-speed drive gear 24a so that they rotate integrally; when the fourth transmission shifter 52B is at its neutral position, the second intermediate shaft 16 rotates relatively with the fourth-speed drive gear 24a.

Between the first common driven gear 23b and the second common driven gear 24b, a third common driven gear 96b is integrally mounted on the counter shaft 14.

The third common driven gear 96b is engaged with the seventh-speed drive gear 97a mounted on the first main shaft 11, and the gear 96b and the seventh-speed drive gear 97a constitute the seventh-speed gear pair 97; and the gear 96b is engaged with the sixth-speed drive gear 96a mounted on the second intermediate shaft 16, and the gear 96b and the sixth-speed drive gear 96a constitute the sixth-speed gear pair 26.

Furthermore, when the second clutch 42 is engaged while the second transmission shifter 52A is in-gear engaged at the sixth-speed connection position, sixth-speed traveling can be performed; moreover, when the first clutch 41 is engaged while the first transmission shifter 51A is in-gear engaged at the seventh-speed connection position, seventh-speed traveling can be performed, whereby assistance or charging can be performed using the motor 7 in each case.

Even in the vehicle drive unit 1A configured as described above, working effects similar to those of the controller for the vehicle drive unit 1 are obtained by performing the above-mentioned pre-shift control. In addition, in the vehicle drive unit 1A, when the third transmission shifter 51B is returned from the fifth-speed connection position to the neutral position and the first transmission shifter 51A is in-gear engaged at the seventh-speed connection position during the traveling using the sixth-speed drive gear 96a, the over speed rotation of the motor 7 during the sixth-speed traveling can be prevented.

Figure 27:
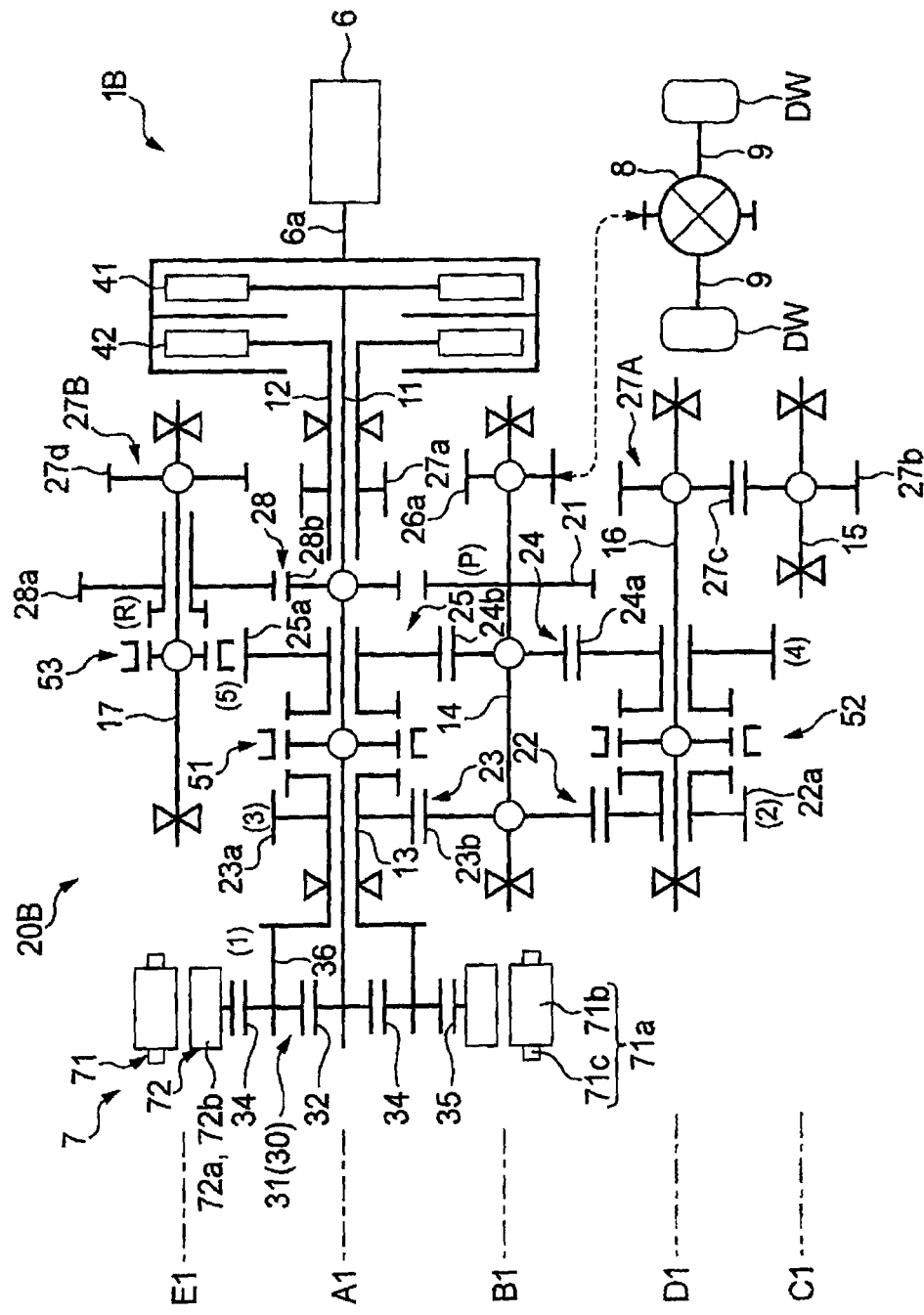
FIG. 27 is a schematic view showing a second modified embodiment of the vehicle drive unit to which the controller according to the present invention is applicable.
Figure 28:
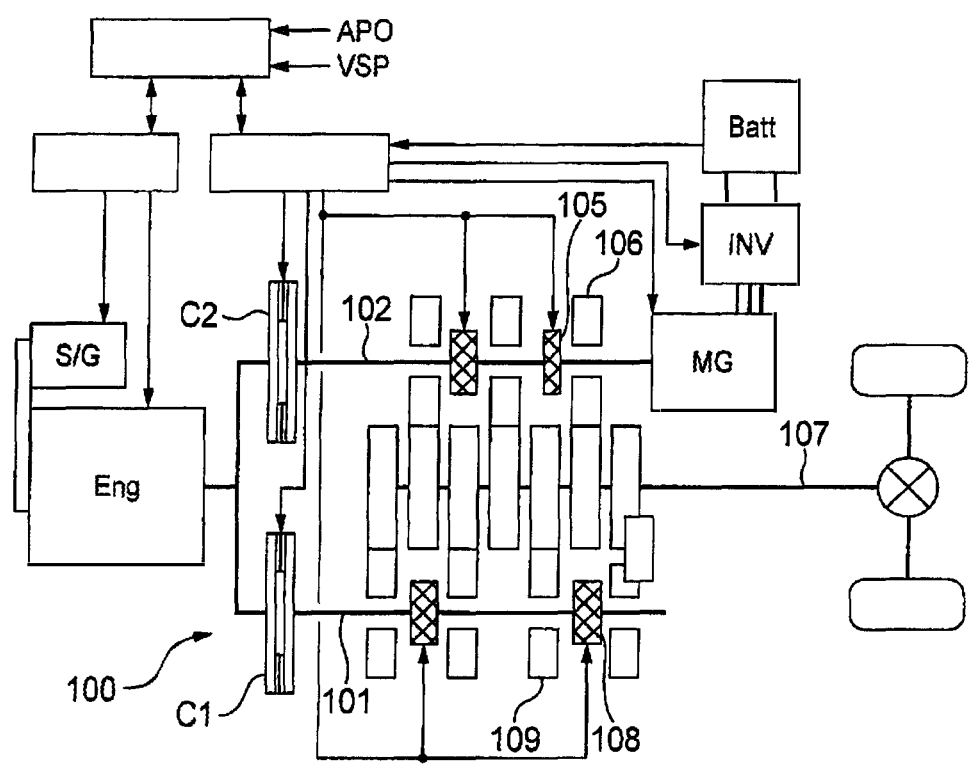
FIG. 28 is a schematic view showing the vehicle drive unit described in Patent document 1.

Next, a second modified embodiment of the vehicle drive unit will be described referring to FIG. 27.

In a vehicle drive unit 1B, the planetary gear mechanism 31 of the transmission 20B thereof constitutes a torque-combining mechanism, and the vehicle drive unit 1B is configured so that the motor 7 is connected to the ring gear and so that the combined torque of the engine torque transmitted to the sun gear 32 and the motor torque input to the ring gear 35 is transmitted from the carrier 36 to the counter shaft 14 through the third-speed gear pair 23.

Even in the vehicle drive unit 1B, when the first transmission shifter 51 is in-gear engaged from the third-speed connection position to the fifth-speed connection position during traveling using the fourth-speed drive gear 24a, the motor 7 rotates at a low rotation speed as viewed from the counter shaft 14 that is driven using the fourth-speed drive gear 24a, whereby over speed rotation of the motor 7 due to the shift change can be prevented and the load on the motor 7 can be reduced.

The present invention is not limited to the above-mentioned respective embodiments but can be modified, improved, etc. as necessary.

Although the synchromesh mechanism 61 capable of performing locking is taken as an example of a locking mechanism, the locking mechanism is not limited to the synchromesh mechanism, and a brake or a one-way clutch having a locking mechanism, capable of stopping the rotation of the ring gear 35, may also be used.

In addition, for example, the differential reduction gear is not limited to the single-pinion type planetary gear mechanism, and a double-pinion type planetary gear mechanism may also be used; furthermore, the differential reduction gear is not limited to a mechanical type such as the planetary gear mechanism, but a magnetic type such as a reciprocal differential motor that performs differential rotation magnetically may also be used.

The present application is based on Japanese Patent Application (No. 2009-165784) filed on Jul. 14, 2009, and the contents thereof are herein incorporated by reference.

DESCRIPTION OF REFERENCE NUMERALS AND CHARACTER 1, 1A, 1B vehicle drive unit
3 battery (electrical accumulating device)
4 SOC detecting device (charge capacity detecting device)
5 ECU
8 motor rotation speed detecting device
9 motor temperature detecting device
57 synchronous position detecting device
58 vehicle speed detecting device
59 shaft rotation speed detecting device
6 engine (internal combustion engine)
7 motor (electric motor)
11 first main shaft (first input/output shaft)
12 second main shaft
13 connecting shaft
14 counter shaft (output/input shaft)
15 first intermediate shaft
16 second intermediate shaft (second input/output shaft)
20, 20A, 20B transmission
30 differential reduction gear
31 planetary gear mechanism
32 sun gear (first rotational element)
35 ring gear (third rotational element)
36 carrier (second rotational element)
41 first clutch (first engaging/disengaging device)
42 second clutch (second engaging/disengaging device)
61 synchromesh mechanism (locking mechanism)

The invention claimed is:
1. A controller for a vehicle drive unit, comprising:
an internal combustion engine;
an electric motor;
a differential reduction gear configured so as to be capable of differentially rotating first to third rotational elements with one another;
a first input/output shaft connected to the first rotational element of the differential reduction gear and selectively connected to the internal combustion engine through a first engaging/disengaging device;
a second input/output shaft selectively connected to the internal combustion engine through a second engaging/disengaging device;
an output/input shaft disposed so that power can be transmitted from the first input/output shaft and the second input/output shaft, wherein:

the electric motor is directly connected to the first input/output shaft, thereby the electric motor is connected to the first rotational element;

a first gear group has a plurality of gears selectable using a first synchronizing device, wherein the first synchronizing device is arranged on the first input/output shaft;

a second gear group has a plurality of gears selectable using a second synchronizing device, wherein the second synchronizing device is arranged on the second input/output shaft;

after the engagement of the first engaging/disengaging device and during driving through one gear of the plurality of gears of the first gear group selected by the first synchronizing device, driving can be performed using one gear of the plurality of gears of the second gear group selected by the second synchronizing device by changing the engagement states of the first engaging/disengaging device and the second engaging/disengaging device, and while driving is performed by transmitting power of the internal combustion engine to the output/input shaft through the one gear of the plurality of gears of the second gear group, pre-shifting is performed to one gear of the plurality of gears of the first gear group, the one gear of the plurality of gears of the first gear group being on a higher speed side than the one gear of the plurality of gears of the second gear group, so that a rotation speed of the electric motor does not exceed a predetermined rotation speed.

2. The controller for the vehicle drive unit according to claim 1, wherein a lock mechanism is provided on the third rotational element.

3. The controller for the vehicle drive unit according to claim 1, wherein a third gear group having a plurality of gears commonly engaged with the gears of the first gear group and the gears of the second gear group is provided on the output/input shaft.

4. The controller for the vehicle drive unit according to claim 1, further comprising:

a vehicle speed detecting device for detecting vehicle speed, and a synchronous position detecting device for detecting a connection position of the first synchronizing device, wherein the first synchronizing device is controlled so that the electric motor rotates in a predetermined vehicle speed range depending on the connection position of the first synchronizing device.

5. The controller for the vehicle drive unit according to claim 1, further comprising:

a detecting device for detecting a rotation speed of the first input/output shaft, wherein the first synchronizing device is controlled so that the first synchronizing device is rotated in a predetermined rotation speed range.

6. The controller for the vehicle drive unit according to claim 1, further comprising:

a detecting device for detecting the rotation speed of the output/input shaft, and a synchronous position detecting device for detecting a connection position of the first synchronizing device, wherein the first synchronizing device is controlled so that the electric motor rotates in a predetermined rotation speed range of the output/input shaft depending on the connection position of the first synchronizing device.

7. The controller for the vehicle drive unit according to a claim 1, further comprising:

a detecting device for detecting the rotation speed of the electric motor, wherein the first synchronizing device is controlled so that the electric motor rotates in a predetermined rotation speed range.

8. The controller for the vehicle drive unit according to claim 1, further comprising:

an electric motor temperature detecting device for detecting a temperature of the electric motor or detecting a value of a current of the electric motor and estimating the temperature of the electric motor from the value of the current of the electric motor, wherein a timing of pre-shifting is corrected depending on the temperature of the electric motor.

9. The controller for the vehicle drive unit according to claim 1, wherein the first synchronizing device is set to a first synchronizing device neutral state in a case that the rotation speed of the electric motor exceeds the predetermined rotation speed or a temperature of the electric motor exceeds a predetermined temperature, while driving is performed using power of the internal combustion engine through the one gear of the plurality of gears of the second gear group although the first synchronizing device has selected a maximum speed gear of the first gear group.

\* \* \* \* \*